United States Patent
Kim et al.

(10) Patent No.: US 11,641,685 B2
(45) Date of Patent: May 2, 2023

(54) TECHNIQUES FOR PERFORMING MULTI-LINK COMMUNICATION IN WIRELESS LOCAL AREA NETWORK SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Suhwook Kim, Seoul (KR); Sungjin Park, Seoul (KR); Taewon Song, Seoul (KR); Insun Jang, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 146 days.

(21) Appl. No.: 17/162,290

(22) Filed: Jan. 29, 2021

(65) Prior Publication Data
US 2021/0259033 A1  Aug. 19, 2021

(30) Foreign Application Priority Data

Jan. 31, 2020 (KR) .......................... 10-2020-0012151
Jan. 14, 2021 (KR) .......................... 10-2021-0005527

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC ...... H04W 76/15; H04W 84/12; H04W 76/11
See application file for complete search history.

(56) References Cited

U.S. PATENT DOCUMENTS

2003/0169716 A1* 9/2003 Saito ..................... H04W 36/18
370/349
2021/0076413 A1* 3/2021 Lu ......................... H04W 74/08

* cited by examiner

*Primary Examiner* — Mohammad S Anwar
(74) *Attorney, Agent, or Firm* — Lee Hong Degerman Kang Waimey

(57) ABSTRACT

According to various embodiments, a multi-link device (MLD) operating in a first link and a second link may transmit information on data buffered in the MLD through a first station (STA) operating in an awake state. The information on the data buffered in the MLD may include a first information field related to the first STA and a second information field related to a second STA.

16 Claims, 31 Drawing Sheets

| 2710 | 2720 | 2730 | 2740 | 2750 | 2760 | 2770 |
|---|---|---|---|---|---|---|
| Link ID | ACI Bitmap | Delta TID | ACI High | Scaling Factor | Queue Size High | Queue Size All |

TECHNIQUES FOR PERFORMING MULTI-LINK COMMUNICATION IN WIRELESS LOCAL AREA NETWORK SYSTEM

CROSS-REFERENCE TO RELATED APPLICATIONS

Pursuant to 35 U.S.C. § 119(a), this application claims the benefit of earlier filing date and right of priority to Korean Patent Application Nos. 10-2020-0012151, filed on Jan. 31, 2020, and 10-2021-0005527, filed on Jan. 14, 2021, the contents of which are all hereby incorporated by reference herein in their entireties.

BACKGROUND OF THE DISCLOSURE

Field of the Disclosure

[1] The present specification relates to a scheme for performing multi-link communication in a wireless local area network (WLAN) system, and more particularly, to a method for transmitting information related to a link in the multi-link communication, and an apparatus supporting the method.

Related Art

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In order to support a high throughput and a high data rate, the EHT standard may use a wide bandwidth (e.g., 160/320 MHz), 16 streams, and/or a multi-link (or multi-band) operation or the like.

In the EHT standard, a multi-link device supporting a multi-link may include a plurality of stations (STAs). Buffered data may be generated in each of the plurality of STAs. When each of the plurality of STAs transmits information on the buffered data to an access point (AP) (or an AP multi-link device), an overhead may increase. Therefore, there may be a request for a technical feature in which one STA (or one link) transmits information on data buffered in all STAs (or all links) at once.

SUMMARY

According to various embodiments, a multi-link device (MLD) operating in a first link and a second link may include: identifying data buffered in the MLD; identifying a first station (STA) operating in an awake state out of the first STA for the first link and a second STA for the second link, which are included in the MLD; and transmitting information on the data buffered in the MLD through the first STA.

The information on the data buffered in the MLD may include a first information field for the first STA and a second information field for the second STA. The first information field may include an identifier (ID) for the first link and information on a queue buffered in the first STA. The second information field may include an ID for the second link and information on a queue buffered in the second STA.

According to various embodiments, an STA included in a non-access point (AP) MLD may transfer information on another STA in the non-AP MLD together through one link. Therefore, there is an advantage in that an overhead of frame exchange is reduced. In addition, there is an advantage in that link usage efficiency of the STA is increased, and the use of power consumption is decreased.

In addition, it is not necessary for all links (or all STAs) to awake for information transmission. By using a link of an STA which is currently in an awake state or which is currently waiting for UL traffic transmission, one frame including not only information on the currently waiting STA but also information of other STAs may be transmitted. Accordingly, there is an advantage in that an operation can be performed very efficiently not only in terms of a frame overhead but also in terms of power saving.

In addition, there is an advantage in that an AP MLD can provide a resource for a proper UL-MU operation for each link (i.e., STA).

BRIEF DESCRIPTION OF THE DRAWINGS

FIG. 27 illustrates an example of a BSR control information subfield.

DESCRIPTION OF EXEMPLARY EMBODIMENTS

Figure 1:
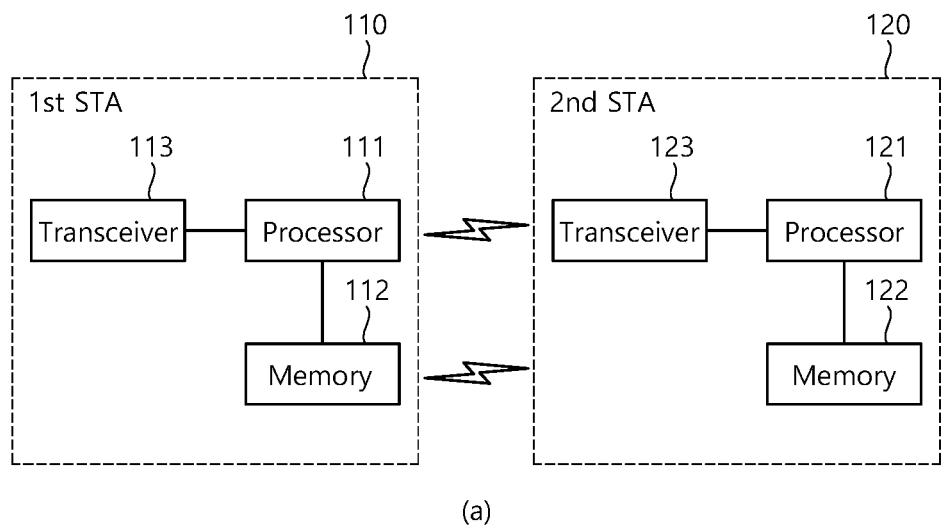
FIG. 1 illustrates an example of a transmitting apparatus and/or receiving apparatus of the present specification.
Figure 1:
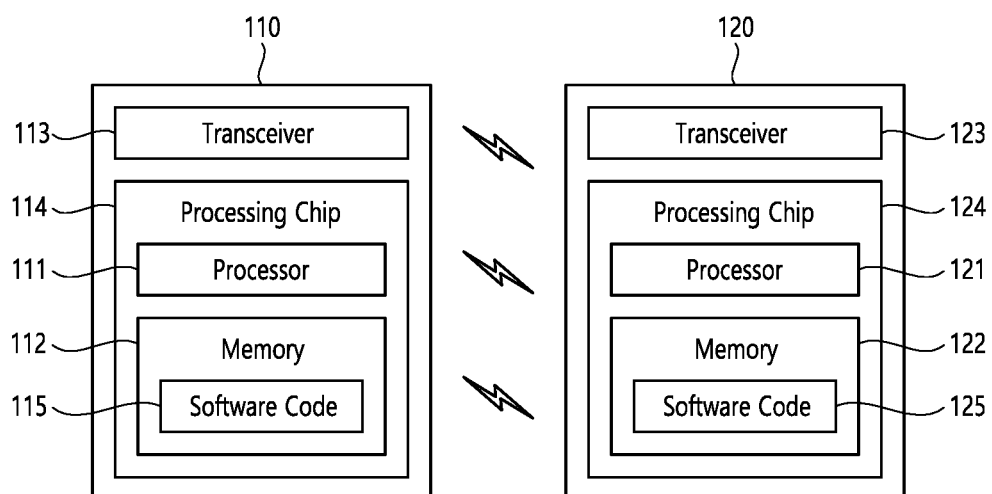

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
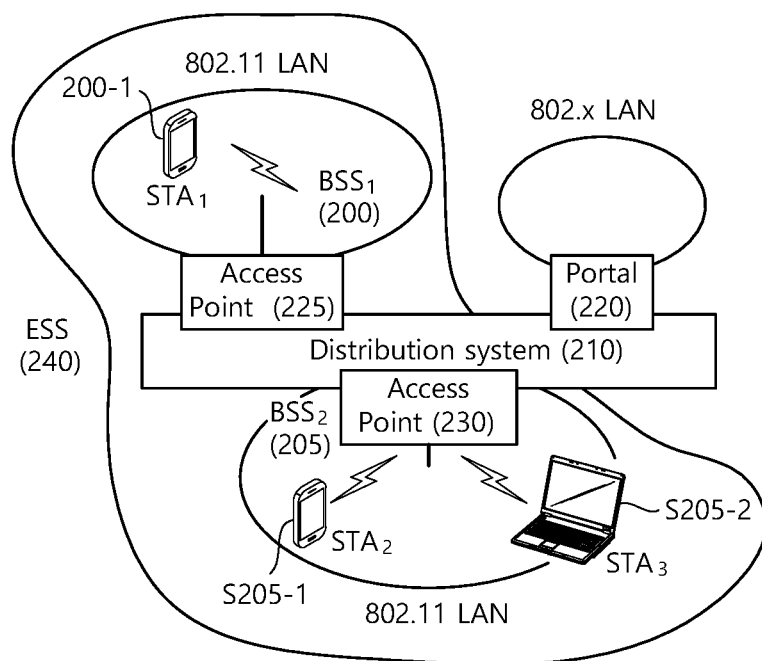
FIG. 2 is a conceptual view illustrating a structure of a WLAN.
Figure 2:
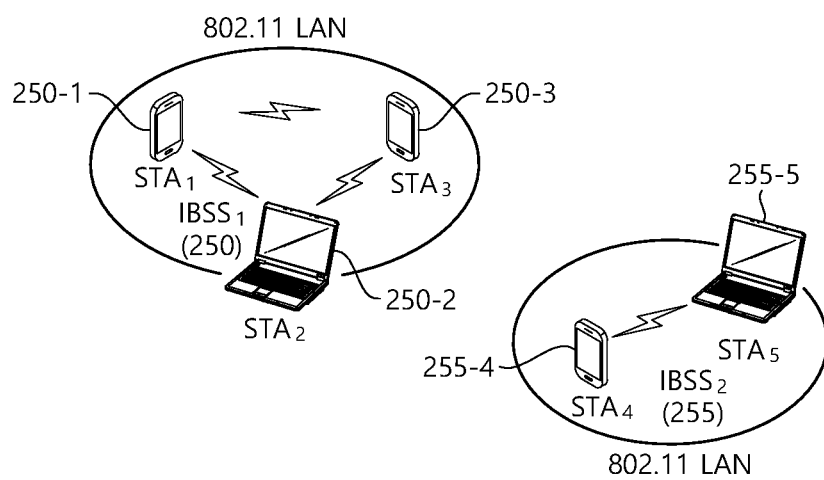

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
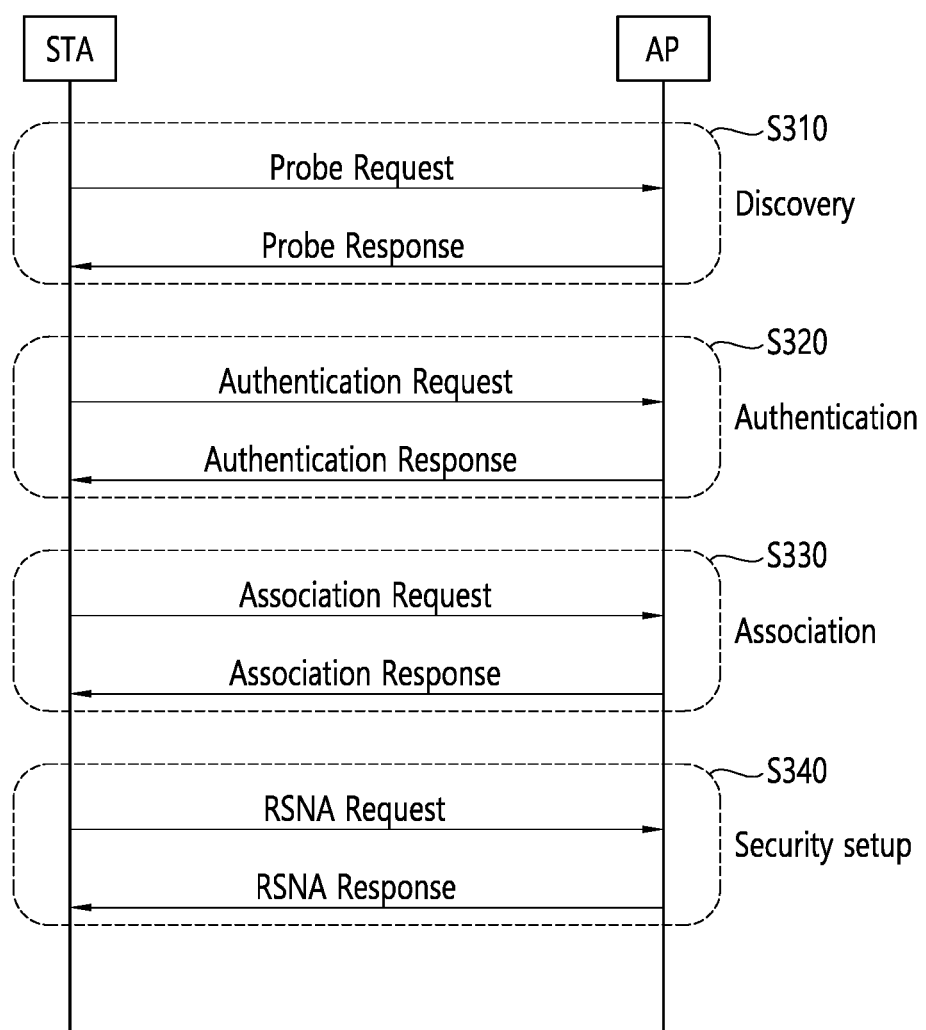
FIG. 3 is a view illustrating a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
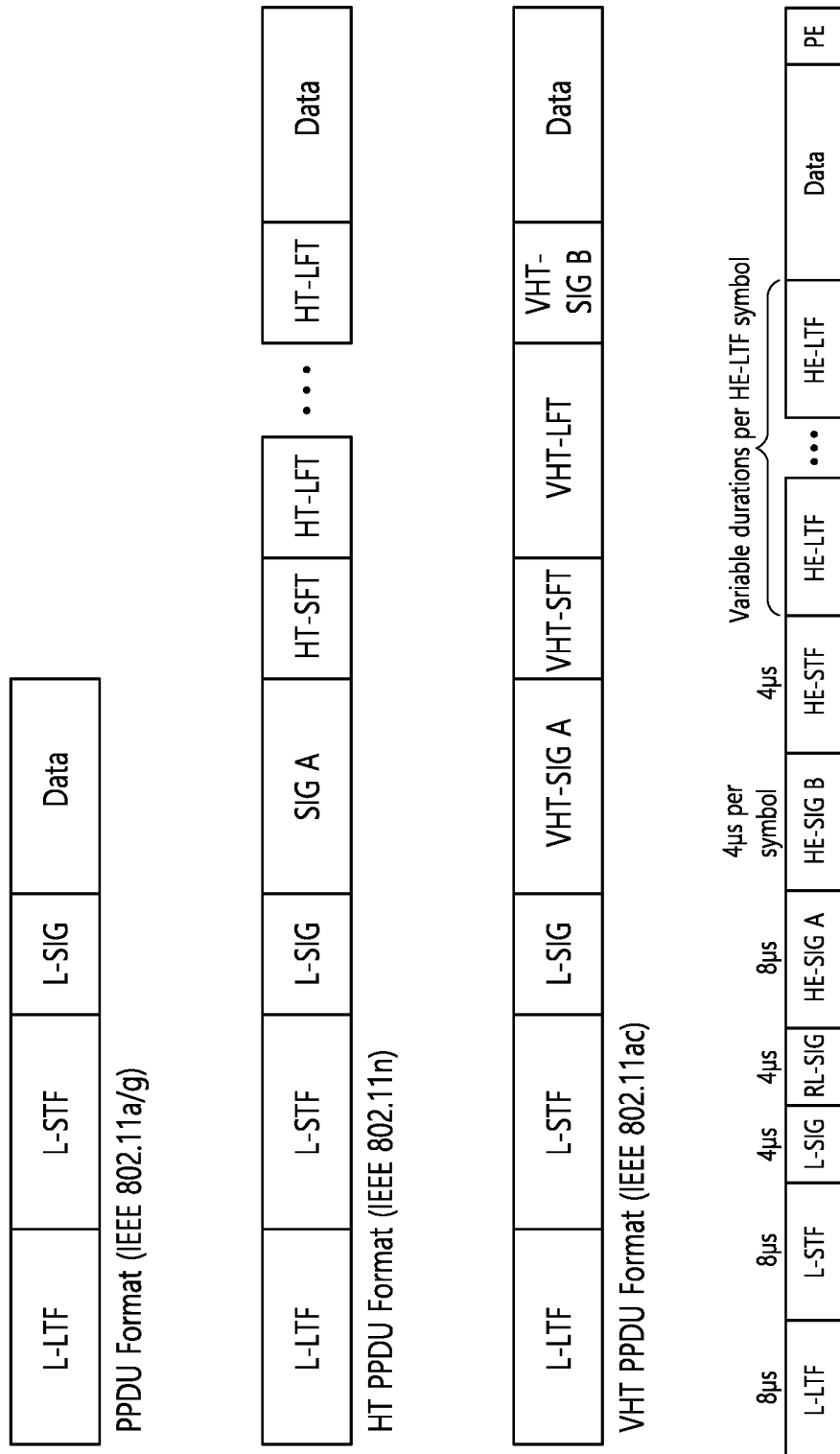
FIG. 4 is a view illustrating an example of a physical protocol data unit (PPDU) used in the IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
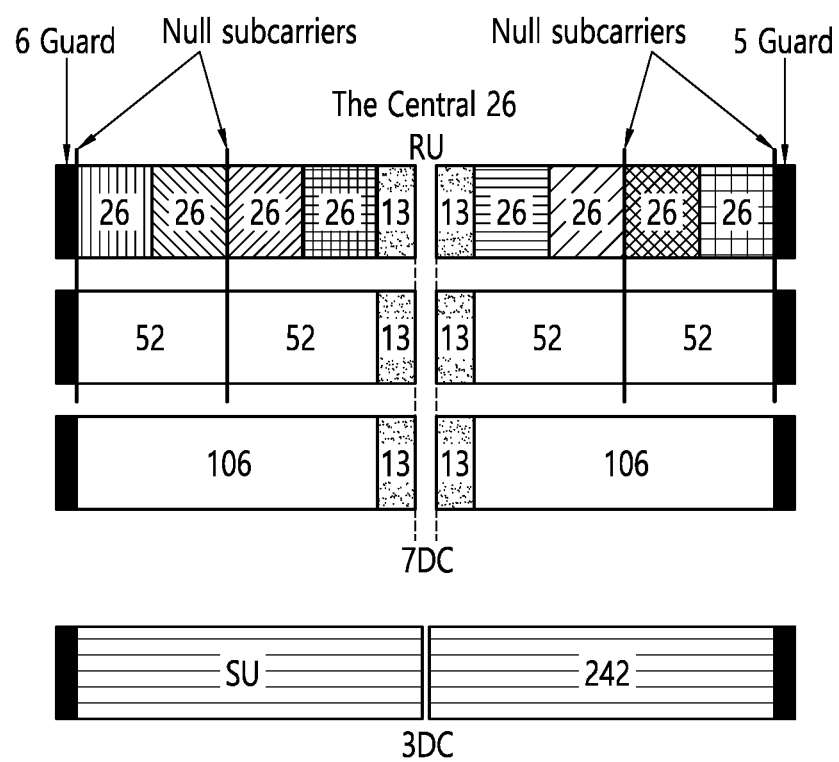
FIG. 5 is a view illustrating an arrangement of a resource unit (RU) used in a 20 MHz band.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
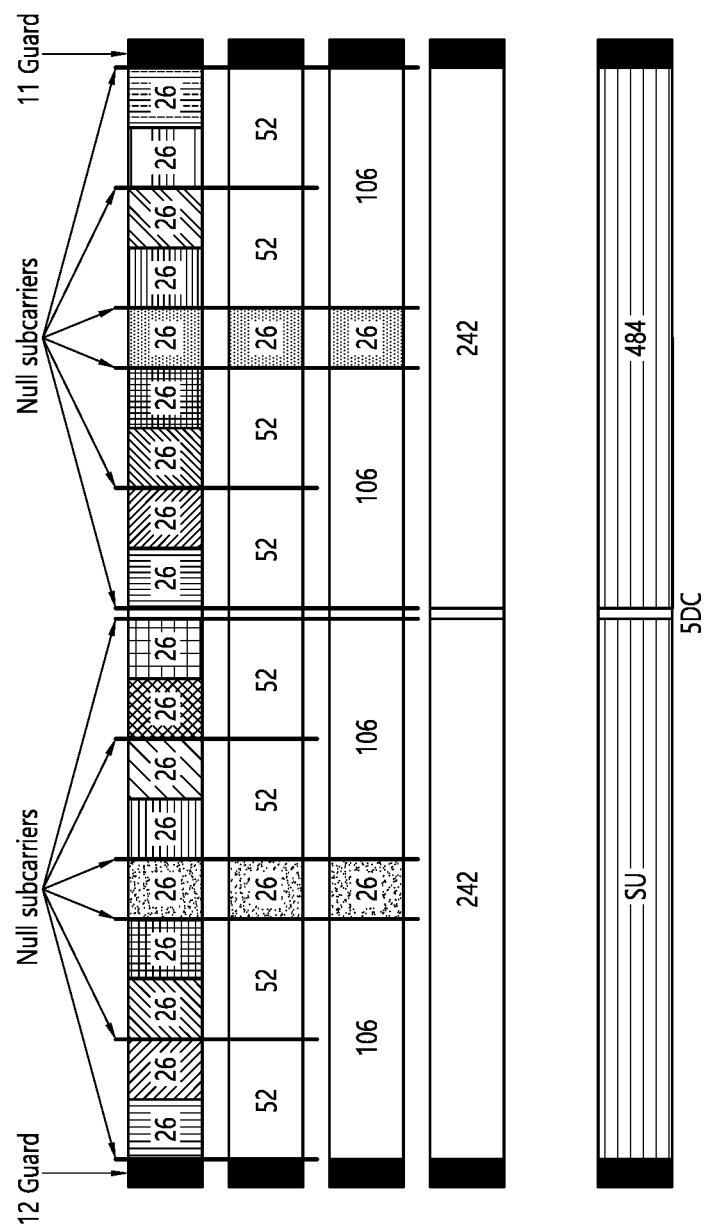
FIG. 6 is a view illustrating an arrangement of a resource unit (RU) used in a 40 MHz band.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
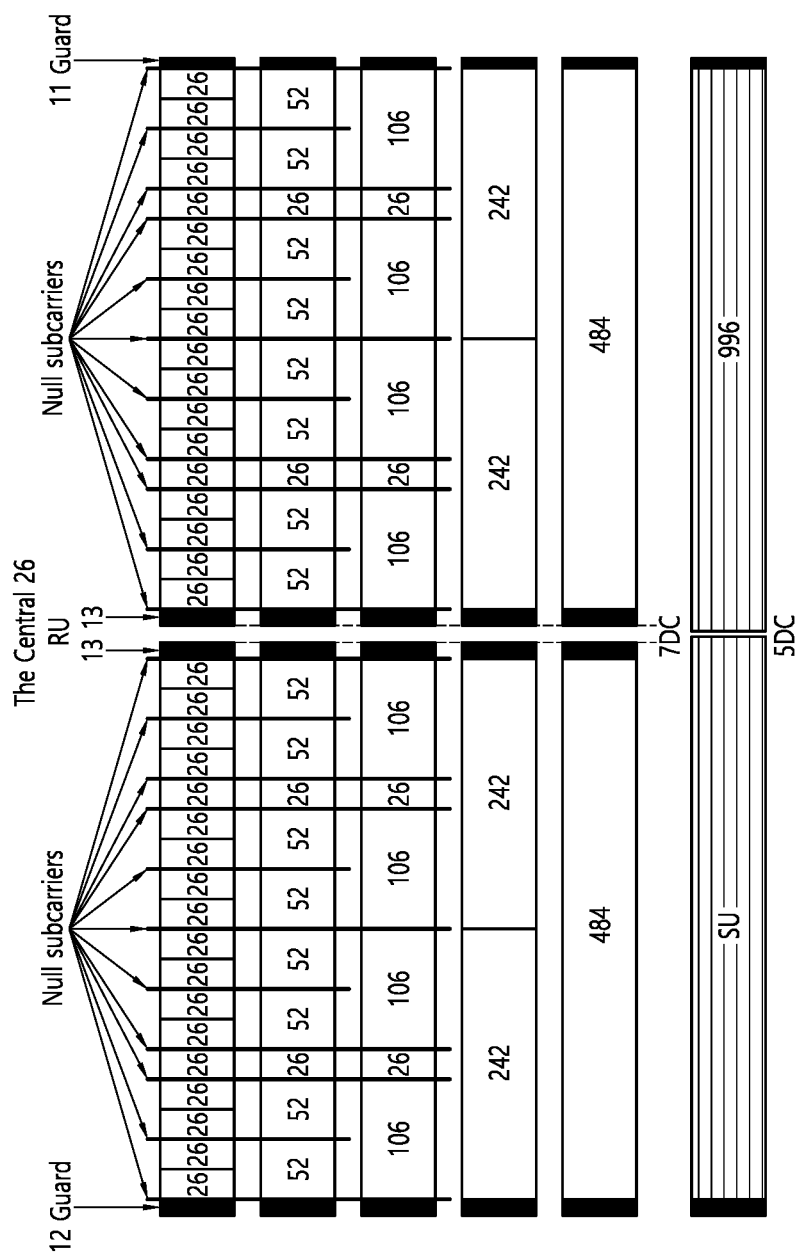
FIG. 7 is a view illustrating an arrangement of a resource unit (RU) used in an 80 MHz band.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
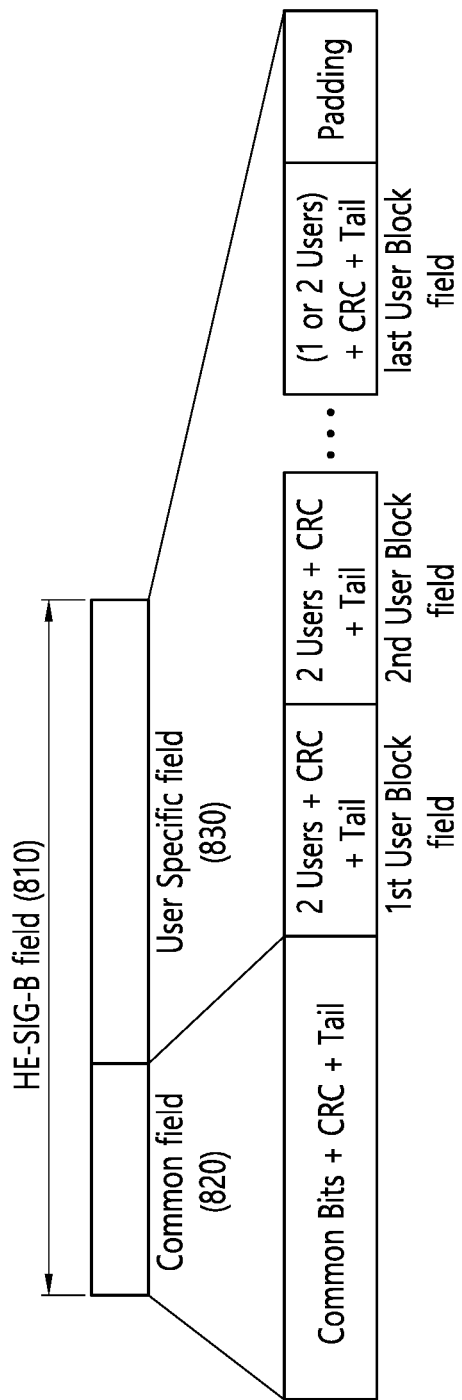
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| S bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |  | 1 |
| 00000010 | 26 | 26 | 26 | 26 | 26 | 52 | 26 | 26 |  | 1 |
| 00000011 | 26 | 26 | 26 | 26 | 26 | 52 | 52 |  |  | 1 |
| 00000100 | 26 | 26 | 52 | 26 | 26 | 26 | 26 |  |  | 1 |
| 00000101 | 26 | 26 | 52 | 26 | 26 | 26 | 52 |  |  | 1 |
| 00000110 | 26 | 26 | 52 | 26 | 52 | 26 | 26 |  |  | 1 |
| 00000111 | 26 | 26 | 52 | 26 | 52 | 52 |  |  |  | 1 |
| 00001000 | 52 | 26 | 26 | 26 | 26 | 26 | 26 |  |  | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| S bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  | 106 |  | 26 | 26 | 26 | 26 | 26 |  | 8 |
| 01001$y_2y_1y_0$ |  | 106 |  | 26 | 26 | 26 | 52 |  |  | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
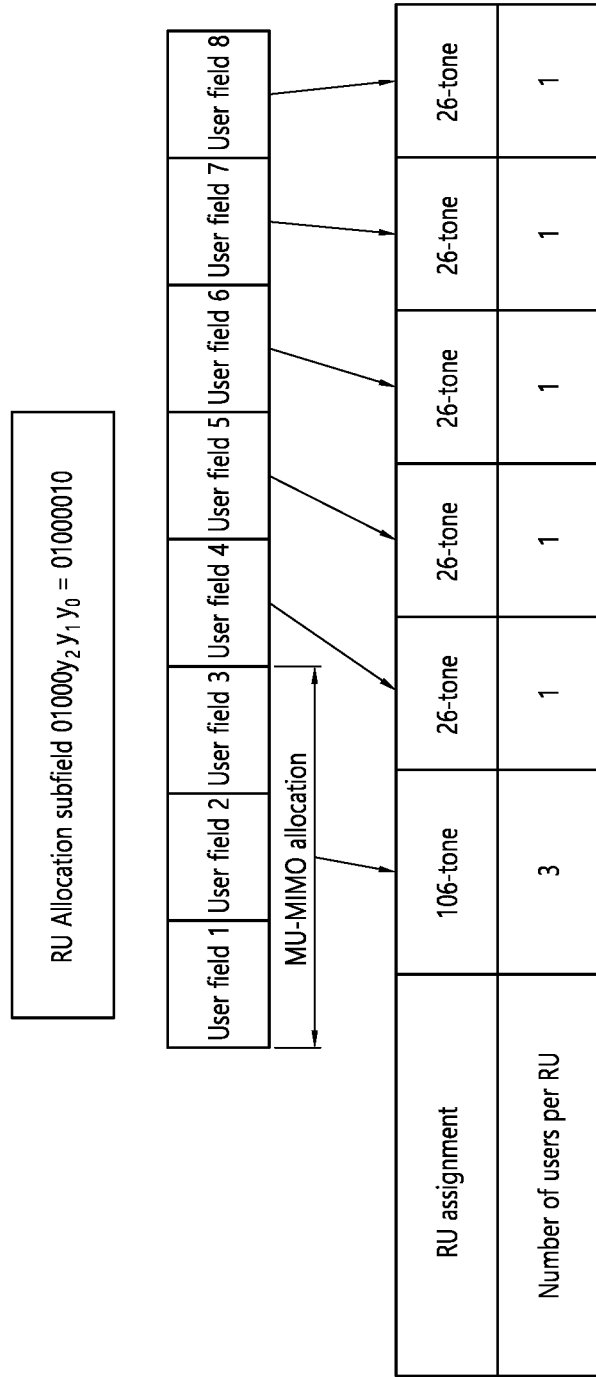
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.).

TABLE 3

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 |    |
|   | 0111-1000 | 3-4 | 3 | | | | | | | 6-7 |    |
|   | 1001      | 4   | 4 | | | | | | | 8   |    |
| 3 | 0000-0011 | 1-4 | 1 | 1 | | | | | | 3-6 | 13 |
|   | 0100-0110 | 2-4 | 2 | 1 | | | | | | 5-7 |    |
|   | 0111-1000 | 3-4 | 3 | 1 | | | | | | 7-8 |    |
|   | 1001-1011 | 2-4 | 2 | 2 | | | | | | 6-8 |    |
|   | 1100      | 3   | 3 | 2 | | | | | | 8   |    |
| 4 | 0000-0011 | 1-4 | 1 | 1 | 1 | | | | | 4-7 | 11 |
|   | 0100-0110 | 2-4 | 2 | 1 | 1 | | | | | 6-8 |    |
|   | 0111      | 3   | 3 | 1 | 1 | | | | | 8   |    |
|   | 1000-1001 | 2-3 | 2 | 2 | 1 | | | | | 7-8 |    |
|   | 1010      | 2   | 2 | 2 | 2 | | | | | 8   |    |

TABLE 4

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-6 | 7 |
|   | 0100-0101 | 2-3 | 2 | 1 | 1 | 1 | | | | 7-8 |   |
|   | 0110      | 2   | 2 | 2 | 1 | 1 | | | | 8   |   |
| 6 | 0000-0010 | 1-3 | 1 | 1 | 1 | 1 | 1 | | | 6-8 | 4 |
|   | 0011      | 2   | 2 | 1 | 1 | 1 | 1 | | | 8   |   |
| 7 | 0000-0001 | 1-2 | 1 | 1 | 1 | 1 | 1 | 1 | | 7-8 | 2 |
| 8 | 0000      | 1   | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a values of the second bit (B11-B14) is "0011", it may be set to N_STS[1]=4, N_STS[2]=1, N_STS [3]=1. That is, in the example of FIG. 9, four spatial streams may be Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
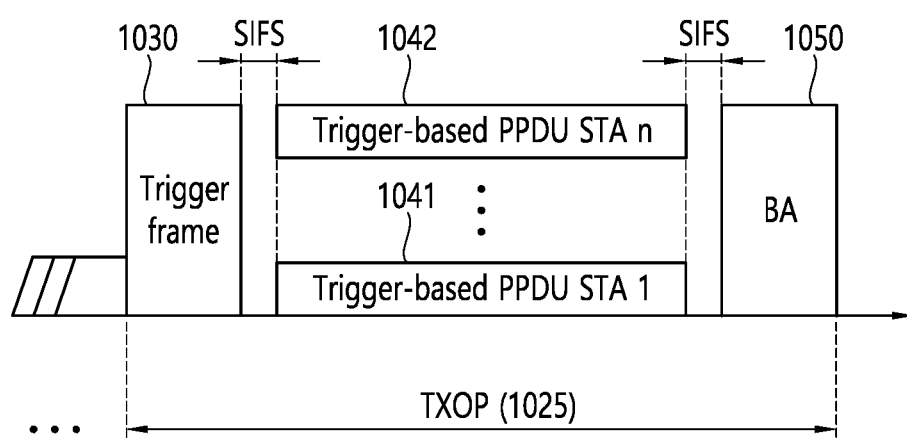
FIG. 10 illustrates an operation based on UL-MU.

FIG. 10 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
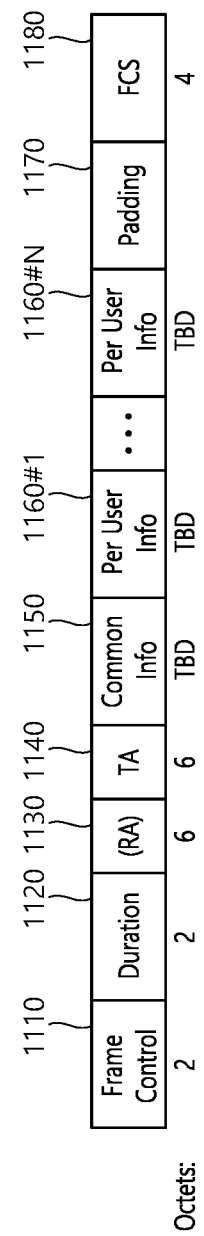
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of an STA.

In addition, an RA field 1130 may include address information of a receiving STA of a corresponding trigger frame, and may be optionally omitted. A TA field 1140 may include address information of an STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
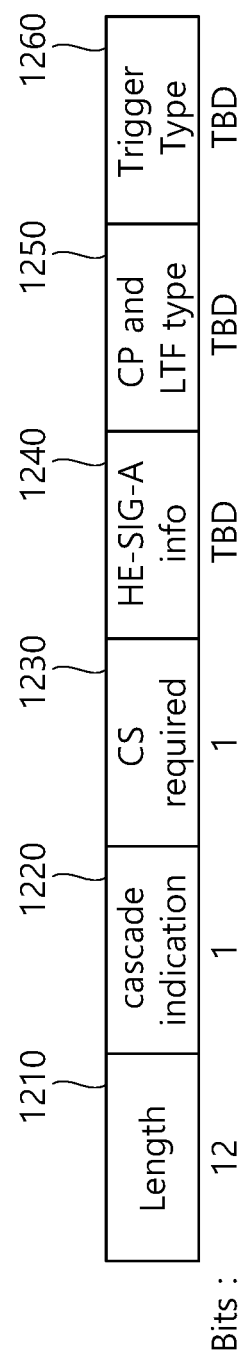
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
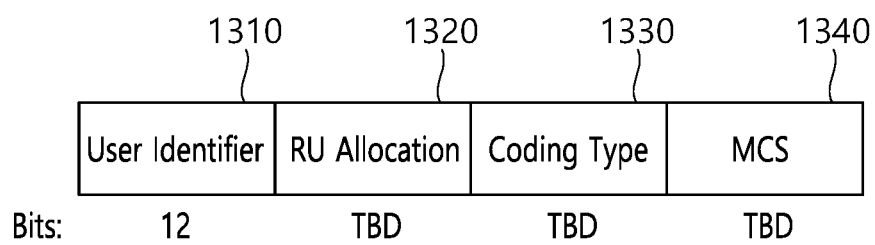
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of an STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
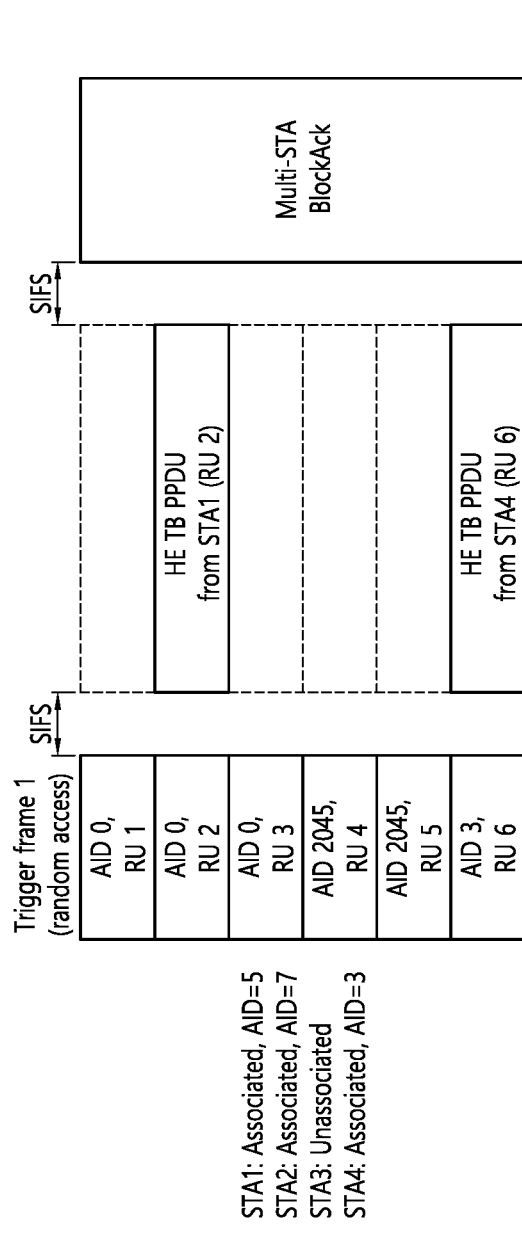
FIG. 14 describes a technical feature of the UORA scheme.

FIG. 14 describes a technical feature of the UORA scheme.

A transmitting STA (e.g., AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of an STA1 is decreased to 0, and the STA1 randomly selects the 2nd RU resource (AID 0, RU 2). In addition, since an OBO counter of an STA2/3 is greater than 0, an uplink resource is not allocated to the STA2/3. In addition, regarding an STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
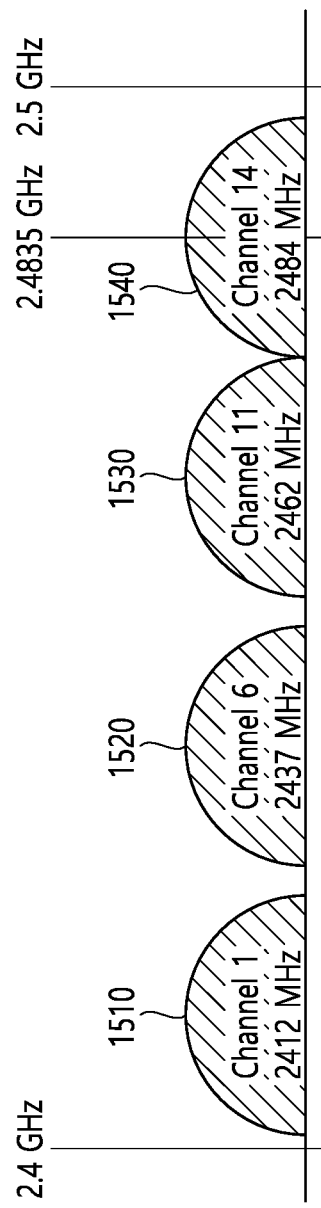
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
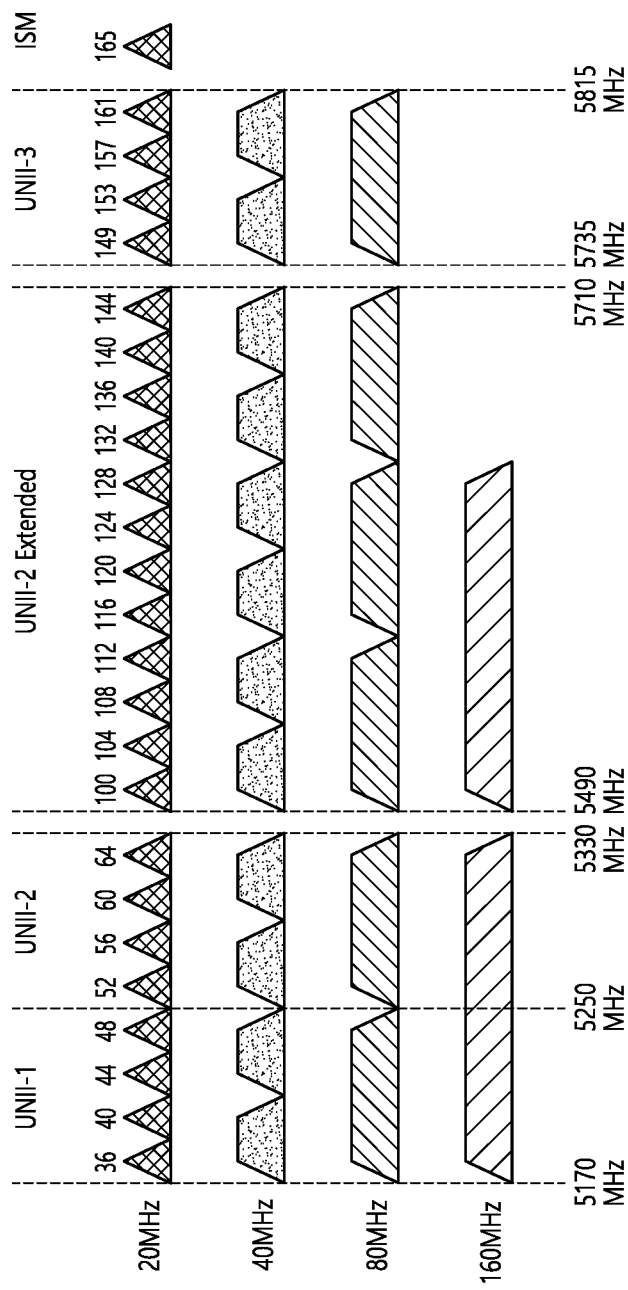
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
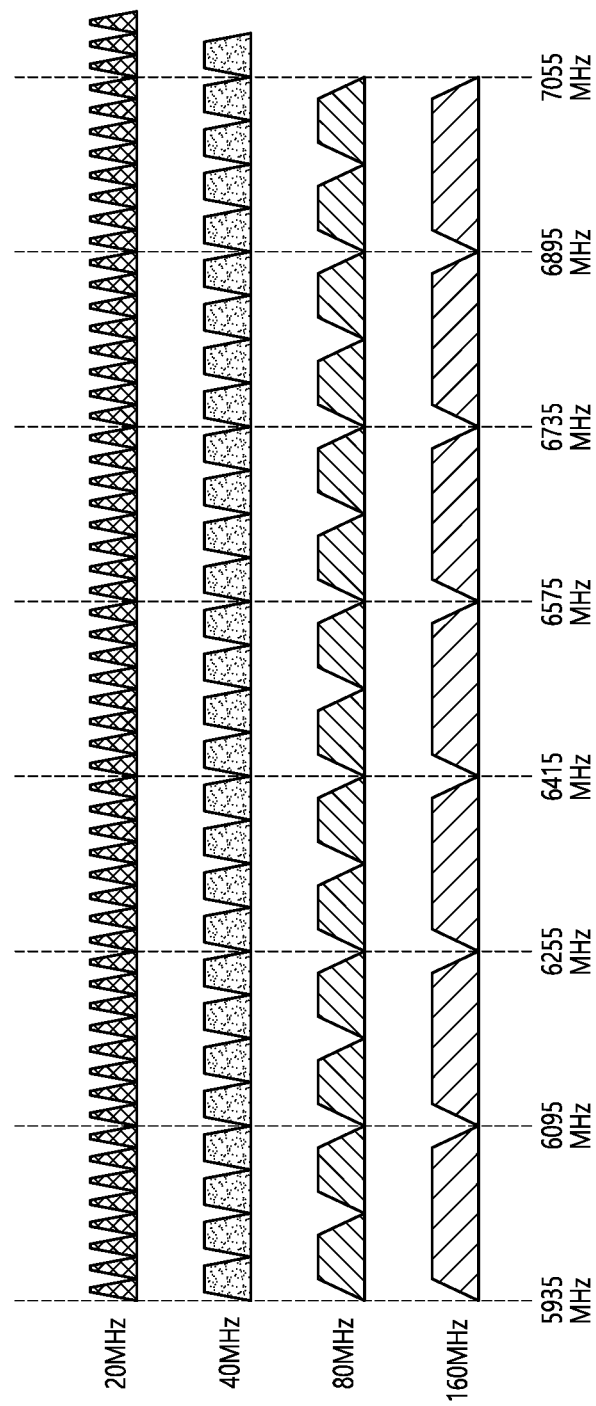
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N)GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in an STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, an STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | 52 | | 26 | 26 | 26 | 26 | 26 | 1 |
| 5 | 26 | 26 | 52 | | 26 | 26 | 26 | 52 | | 1 |
| 6 | 26 | 26 | 52 | | 26 | 52 | | 26 | 26 | 1 |
| 7 | 26 | 26 | 52 | | 26 | 52 | | 52 | | 1 |
| 8 | | 52 | 26 | 26 | 26 | 26 | 26 | 26 | 26 | 1 |
| 9 | | 52 | 26 | 26 | 26 | 26 | 26 | 52 | | 1 |
| 10 | | 52 | 26 | 26 | 26 | 52 | | 26 | 26 | 1 |
| 11 | | 52 | 26 | 26 | 26 | 52 | | 52 | | 1 |
| 12 | | 52 | | 52 | 26 | 26 | 26 | 26 | 26 | 1 |
| 13 | | 52 | | 52 | 26 | 26 | 26 | 52 | | 1 |
| 14 | | 52 | | 52 | 26 | 52 | | 26 | 26 | 1 |
| 15 | | 52 | | 52 | 26 | 52 | | 52 | | 1 |
| 16 | 26 | 26 | 26 | 26 | 26 | | 106 | | | 1 |
| 17 | 26 | 26 | | 52 | 26 | | 106 | | | 1 |
| 18 | | 52 | 26 | 26 | 26 | | 106 | | | 1 |
| 19 | | 52 | | 52 | 26 | | 106 | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | | 26 | 26 | 26 | 26 | 26 | 1 |
| 21 | | 106 | | | 26 | 26 | 26 | | 52 | 1 |
| 22 | | 106 | | | 26 | | 52 | 26 | 26 | 1 |
| 23 | | 106 | | | 26 | | 52 | | 52 | 1 |
| 24 | 52 | | 52 | | — | | 52 | | 52 | 1 |
| 25 | 242-tone RU empty (with zero users) | | | | | | | | | 1 |
| 26 | | 106 | | | 26 | | 106 | | | 1 |
| 27-34 | | | | | 242 | | | | | 8 |
| 35-42 | | | | | 484 | | | | | 8 |
| 43-50 | | | | | 996 | | | | | 8 |
| 51-58 | | | | | 2 * 996 | | | | | 8 |
| 59 | 26 | 26 | 26 | 26 | 26 | | 52 + 26 | | 26 | 1 |
| 60 | 26 | | 26 + 52 | | 26 | 26 | 26 | 26 | 26 | 1 |
| 61 | 26 | | 26 + 52 | | 26 | 26 | 26 | | 52 | 1 |
| 62 | 26 | | 26 + 52 | | 26 | | 52 | 26 | 26 | 1 |
| 63 | 26 | 26 | 52 | | 26 | | 52 + 26 | | 26 | 1 |
| 64 | 26 | | 26 + 52 | | 26 | | 52 + 26 | | 26 | 1 |
| 65 | 26 | | 26 + 52 | | 26 | | 52 | | 52 | 1 |

TABLE 7

| | | | | | | | | | | |
|---|---|---|---|---|---|---|---|---|---|---|
| 66 | 52 | | 26 | 26 | 26 | | 52 + 26 | | 26 | 1 |
| 67 | 52 | | | 52 | | 26 | 52 + 26 | | 26 | 1 |
| 68 | 52 | | | 52 + 26 | | | 52 | | 52 | 1 |
| 69 | 26 | 26 | 26 | 26 | | | 26 + 106 | | | 1 |
| 70 | 26 | | 26 + 52 | | 26 | | 106 | | | 1 |
| 71 | 26 | 26 | | 52 | | | 26 + 106 | | | 1 |
| 72 | 26 | | 26 + 52 | | | | 26 + 106 | | | 1 |
| 73 | 52 | | 26 | 26 | | | 26 + 106 | | | 1 |
| 74 | 52 | | | 52 | | | 26 + 106 | | | 1 |
| 75 | | 106 + 26 | | | | 26 | 26 | 26 | 26 | 1 |
| 76 | | 106 + 26 | | | | 26 | 26 | | 52 | 1 |
| 77 | | 106 + 26 | | | | | 52 | 26 | 26 | 1 |
| 78 | | 106 | | | 26 | | 52 + 26 | | 26 | 1 |
| 79 | | 106 + 26 | | | | | 52 + 26 | | 26 | 1 |
| 80 | | 106 + 26 | | | | | 52 | | 52 | 1 |
| 81 | | 106 + 26 | | | | | | 106 | | 1 |
| 82 | | 106 | | | | | 26 + 106 | | | 1 |

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1x STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2x STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1x STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, * implies multiplication, and sqrt( ) implies a square root. In addition, j implies an imaginary number.

$$EHT\text{-}STF(-112{:}16{:}112)=\{M\}*(1+j)/\text{sqrt}(2)$$

$$EHT\text{-}STF(0)=0 \quad \text{<Equation 2>}$$

The EHT-STF for the 40 MHz PPDU may be configured based on the following equation. The following example may be the first type (i.e., 1x STF) sequence.

$$EHT\text{-}STF(-240{:}16{:}240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1x STF) sequence.

$$EHT\text{-}STF(-496{:}16{:}496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1x STF) sequence.

$$EHT\text{-}STF(-1008{:}16{:}1008)=\{M,1,-M,0,-M,1,-M,0,-M,-1,M,0,-M,1,-M\}*(1+j)/\text{sqrt}(2) \quad \text{<Equation 5>}$$

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

$$EHT\text{-}STF(-496{:}16{:}496)=\{-M,-1,M,0,-M,1,-M\}*(1+j)/\text{sqrt}(2) \quad \text{<Equation 6>}$$

Equation 7 to Equation 11 below relate to an example of a second type (i.e., 2x STF) sequence.

$$EHT\text{-}STF(-120{:}8{:}120)=\{M,0,-M\}*(1+j)/\text{sqrt}(2) \quad \text{<Equation 7>}$$

The EHT-STF for the 40 MHz PPDU may be configured based on the following equation.

$$EHT\text{-}STF(-248{:}8{:}248)=\{M,-1,-M,0,M,-1,M\}*(1+j)/\text{sqrt}(2)$$

$$EHT\text{-}STF(-248)=0$$

$$EHT\text{-}STF(248)=0 \quad \text{<Equation 8>}$$

The EHT-STF for the 80 MHz PPDU may be configured based on the following equation.

$$EHT\text{-}STF(-504{:}8{:}504)=\{M,-1,M,-1,-M,-1,M,0,-M,1,M,1,-M,1,-M\}*(1+j)/\text{sqrt}(2) \quad \text{<Equation 9>}$$

The EHT-STF for the 160 MHz PPDU may be configured based on the following equation.

$$EHT\text{-}STF(-1016{:}16{:}1016)=\{M,-1,M,-1,-M,-1,M,0,-M,1,M,1,-M,1,-M,0,-M,1,-M,1,M,1,-M,0,-M,1,M,1,-M,1,-M\}*(1+j)/\text{sqrt}(2)$$

$$EHT\text{-}STF(-8)=0, EHT\text{-}STF(8)=0,$$

$$EHT\text{-}STF(-1016)=0, EHT\text{-}STF(1016)=0 \quad \text{<Equation 10>}$$

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

$$EHT\text{-}STF(-504{:}8{:}504)=\{-M,1,-M,1,M,1,-M,0,-M,1,M,1,-M,1,-M\}*(1+j)/\text{sqrt}(2)$$

$$EHT\text{-}STF(-504)=0,$$

$$EHT\text{-}STF(504)=0 \quad \text{<Equation 11>}$$

The EHT-LTF may have first, second, and third types (i.e., 1x, 2x, 4x LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 µs. In addition, a GI (e.g., 0.8/1/6/3.2 µs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "module 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
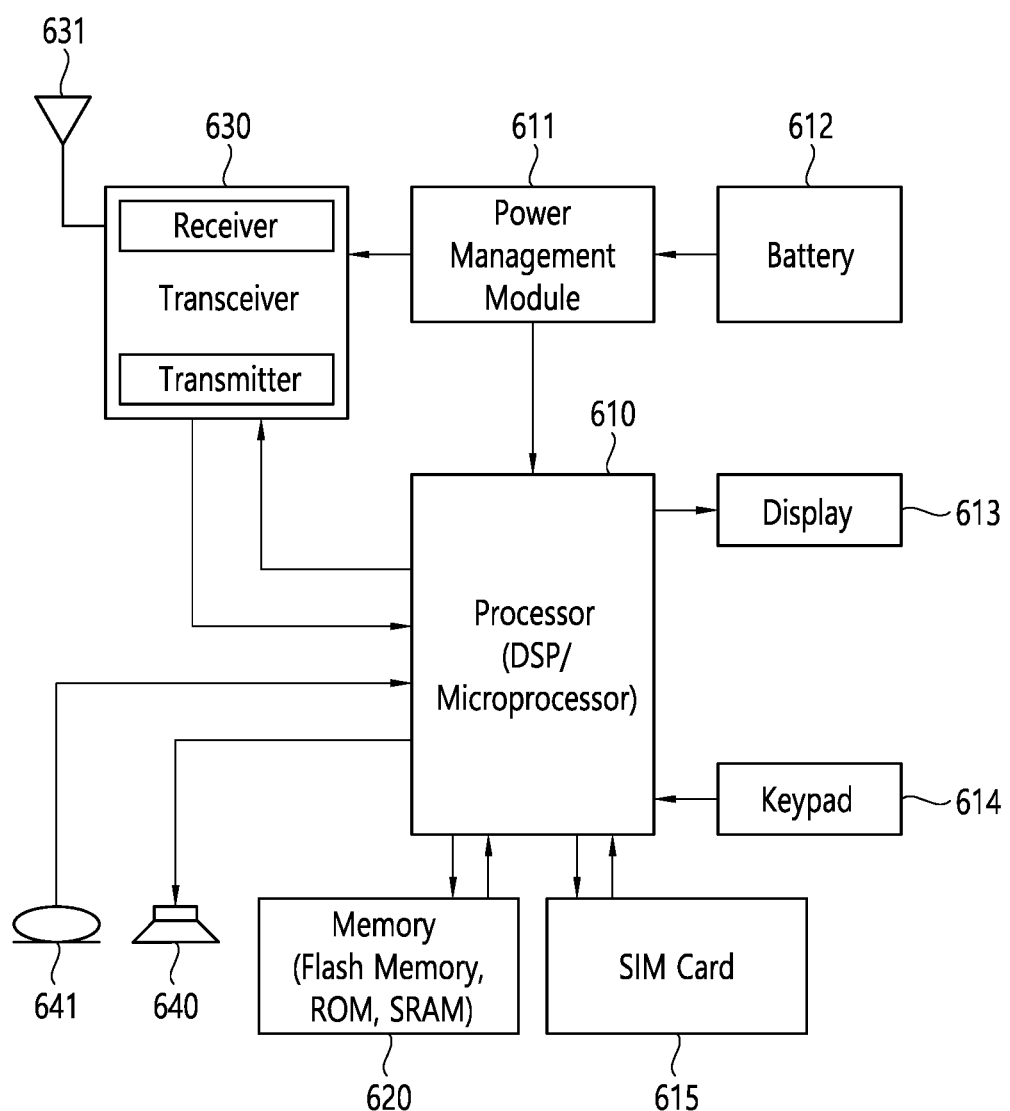
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, a technical feature of channel bonding supported by an STA of the present specification is described.

For example, in an IEEE 802.11n system, 40 MHz channel bonding may be performed by coupling two 20 MHz channels. In addition, in an IEEE 802.11ac system, 40/80/160 MHz channel bonding may be performed.

For example, the STA may perform channel bonding for a primary 20 MHz channel (P20 channel) and a secondary 20 MHz channel (S20 channel). A backoff count/counter may be used in a channel bonding process. A backoff count value may be selected as a random value, and may be decreased during a backoff interval. In general, when the backoff count value is 0, the STA may attempt an access to a channel.

The STA which performs channel bonding determines whether the S20 channel has maintained an idle state during a specific period (e.g., point coordination function interframe space (PIFS)), at a timing at which a backoff count value for the P20 channel is 0 since it is determined that the P20 channel is in the idle state during the backoff interval. If the S20 channel is in the idle state, the STA may perform bonding for the P20 channel and the S20 channel. That is, the STA may transmit a signal (PPDU) through the 40 MHz channel (i.e., 40 MHz bonding channel) including the P20 channel and the S20 channel.

Figure 20:
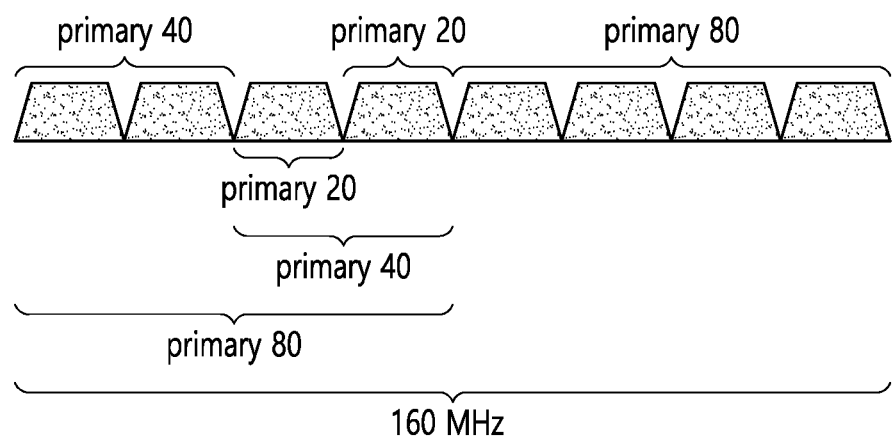
FIG. 20 illustrates an example of channel bonding.

FIG. 20 illustrates an example of channel bonding. As shown in FIG. 20, a primary 20 MHz channel and a secondary 20 MHz channel may configure a 40 MHz channel (primary 40 MHz channel) through channel bonding. That is, the bonded 40 MHz channel may include the primary 20 MHz channel and the secondary 20 MHz channel.

The channel bonding may be performed when a channel consecutive to the primary channel is in an idle state. That is, the primary 20 MHz channel, the secondary 20 MHz channel, a secondary 40 MHz channel, and a secondary 80 MHz channel may be bonded sequentially. If it is determined that the secondary 20 MHz channel is in a busy state, the channel bonding may not be performed even if all other secondary channels are in the idle state. In addition, if it is determined that the secondary 20 MHz channel is in the idle state and the secondary 40 MHz channel is in the busy state, the channel bonding may be performed only for the primary 20 MHz channel and the secondary 20 MHz channel.

Hereinafter, preamble puncturing supported by an STA of the present specification is described.

For example, in the example of FIG. 20, when the primary 20 MHz channel, the secondary 40 MHz channel, and the secondary 80 MHz channel are in an idle state but the secondary 20 MHz channel is in a busy state, bonding for the secondary 40 MHz channel and the secondary 80 MHz channel may be impossible. In this case, the STA may configure a 160 MHz PPDU and perform preamble puncturing on a preamble (e.g., L-STF, L-LTF, L-SIG, RL-SIG, U-SIG, HE-SIG-A, HE-SIG-B, HE-STF, HE-LTF, EHT-SIG, EHT-STF, EHT-LTF, etc.) transmitted through the secondary 20 MHz cannel to transmit a signal through a channel which is in the idle state. In other words, the STA may perform preamble puncturing on some bands of the PPDU. Information on the preamble puncturing (e.g., information on a 20/40/80 MHz channel to which puncturing is applied) may be included in a signal field (e.g., HE-SIG-A, U-SIG, EHT-SIG) of the PPDU.

Hereinafter, a technical feature for a multi-link (ML) supported by an STA of the present specification is described.

The STA (AP and/or non-AP STA) of the present specification may support ML communication. The ML communication may imply communication supporting a plurality of links. A link related to the ML communication may include channels (e.g., 20/40/80/160/240/320 MHz channels) of the 2.4 GHz band disclosed in FIG. 15, the 5 GHz band disclosed in FIG. 16, and the 6 GHz band disclosed in FIG. 17.

The plurality of links used for the ML communication may be set up variously. For example, the plurality of links supported in one STA for the ML communication may be a plurality of channels in the 2.4 GHz band, a plurality of channels in the 5 GHz band, and a plurality of channels in the 6 GHz band. Alternatively, the plurality of links supported in one STA for the ML communication may be a combination of at least one channel in the 2.4 GHz band (or the 5 GHz/6 GHz band) and at least one channel in the 5 GHz band (or the 2.4 GHz/6 GHz band). Meanwhile, at least one of the plurality of links supported in one STA for the ML communication may be a channel to which preamble puncturing is applied.

The STA may perform an ML setup to perform the ML communication. The ML setup may be performed based on a control frame or a management frame such as Beacon, Probe Request/Response, Association Request/Response, or the like. For example, the information on the ML setup may be included in an element field included in the Beacon, the Probe Request/Response, and the Association Request/Response.

When the ML setup is complete, an enabled link for the ML communication may be determined. The STA may perform frame exchange through at least one of a plurality of links determined as the enabled link. For example, the enabled link may be used for at least one of the management frame, the control frame, and the data frame.

When one STA supports a plurality of links, a transmitting/receiving device supporting each link may operate like one logical STA. For example, one STA supporting two links may be represented as one multi-link (ML) device (MLD) including a first STA for a first link and a second STA for a second link. For example, one AP supporting two links may be represented as one AP MLD including a first AP for the first link and a second AP for the second link. In addition, one non-AP supporting two links may be represented as one non-AP MLD including the first STA for the first link and the second STA for the second link.

Hereinafter, a specific feature for the ML setup is described in greater detail.

An MLD (AP MLD and/or non-AP MLD) may transmit information on a link which can be supported by the MLD through the ML setup. The information on the link may be configured variously. For example, the information on the link may include at least one of: 1) information on whether the MLD (or STA) supports a simultaneous RX/TX operation; 2) information on the number/upper limit of uplink/downlink links supported by the MLD (or STA); 3) information on a location/band/resource of the uplink/downlink links supported by the MLD (or STA); 4) information on a type (management. control, data, etc.) of a frame available or preferred in at least one uplink/downlink link; 5) information on an ACK policy available or preferred in at least one uplink/downlink link; and 6) information on a traffic identifier (TID) available or preferred in at least one uplink/downlink link. The TID relates to a priority of traffic data, and is represented with 8-type values according to the conventional WLAN standard. That is, 8 TID values corresponding to 4 access categories (ACs) (AC_BK(background), AC_BE(best effort), AC_VI(video), AC_VO (voice)) may be defined according to the conventional WLAN standard.

For example, it may be pre-configured that all TIDs are mapped for uplink/downlink links. Specifically, when negotiation is not achieved through the ML setup, all TIDs may be used for the ML communication, and when mapping between the uplink/downlink link and the TID is negotiated through an additional ML setup, a negotiated TID may be used for the ML communication.

A plurality of links which can be used by a TX MLD and RX MLD related to ML communication may be set up through the ML setup, and this may be called an "enabled link". The "enabled link" may be called various other names. For example, it may be called various names such as a first link, a second link, a TX link, an RX link, etc.

After the ML setup is complete, the MLD may update the ML setup. For example, when there is a need to update information on a link, the MLD may transmit information on a new link. The information on the new link may be transmitted based on at least one of a management frame, a control frame, and a data frame.

According to an embodiment, the MLD may include a non-AP MLD and an AP-MLD. The non-AP MLD and the AP-MLD may be classified according to a function of an access point (AP). The non-AP MLD and the AP-MLD may be physically classified or may be logically classified. For example, when the MLD performs the function of the AP, it may be called the AP MLD, and when the MLD performs a function of an STA, it may be called the non-AP MLD.

According to an embodiment, in the EHT standard (i.e., 802.11be), a multi-link may be classified into primary/secondary links to reduce power consumption. An AP supporting the multi-link may manage each link by designating the link as the primary link or the secondary link. The AP may designate one or more links among several links as the primary link. Links other than the primary link may operate as the secondary link. The primary link may be called variously. For example, the primary link may be called an anchor link. In addition, the secondary link may also be called variously. For example, the secondary link may be called a non-anchor link.

According to an embodiment, the primary link may imply a link which performs all functions of the link. In addition, the secondary link may imply a link which performs a limited function (e.g., data frame exchange) for power saving.

According to an embodiment, in the EHT standard, the multi-link may be classified into general/power saving links. The aforementioned primary link may correspond to the general link. In other words, the aforementioned primary link may relate to the general link. In addition, the aforementioned secondary link may correspond to the power saving link. In other words, the aforementioned secondary link may relate to the power saving link.

For example, the primary link may be used not only for frame exchange for synchronization but also for non-data frame exchange (i.e., control/management frame exchange). The secondary link may be used only for data frame exchange.

Therefore, the STA may listen only the primary link to receive a beacon and/or a control/management frame during an idle period (or duration). In other words, the STA may operate only in the primary link to receive the beacon and/or the control/management frame during the idle period (or duration). Therefore, a non-AP MLD shall be connected to at least one primary link.

In the following specification, the MLD has one or more connected STAs, and has one MAC service access point (SAP) to an upper link layer (logical link control (LLC)). The MLD may imply a physical device or a logical device. Hereinafter, the device may imply the MLD.

In addition, the MLD may include at least one STA connected to each link of the multi-link. For example, a processor of the MLD may control the at least one STA. For example, each of the at least one STA may be configured and operate independently. Each of the at least one STA may include a processor and a transceiver. For example, the at least one STA may operate independently irrespective of the processor of the MLD.

Although it is described, for convenience of description, in the following specification that the MLD (or the processor of the MLD) controls at least one STA, the disclosure is not limited thereto. As described above, the at least one STA may transmit/receive a signal independently irrespective of the MLD.

According to an embodiment, the AP MLD or the non-AP MLD may be configured in a structure having a plurality of links. In other words, the non-AP MLD may support the plurality of links. The non-AP MLD may include a plurality of STAs. The plurality of STAs may have a link for each STA.

For example, the non-AP MLD may include an STA 1, an STA 2, and an STA 3. The STA 1 may operate in a link 1. The link 1 may be included in a 5 GHz band. The STA 2 may operate in a link 2. The link 2 may be included in a 6 GHz band. The STA 3 may operate in a link 3. The link 3 may be included in the 5 GHz band. The band included in the link 1/2/3 is for exemplary purposes, and may be included in the 2.4, 5, and 6 GHz bands.

In the EHT standard (802.11be standard), a multi-link device (MLD) structure in which one AP/non-AP MLD supports several links is considered as a main technology. An STA included in the non-AP MLD may transfer information on another STA in the non-AP MLD together through one link. Therefore, there is an advantage in that an overhead of frame exchange is reduced. In addition, there is an advantage in that link usage efficiency of the STA is increased, and the use of power consumption is decreased.

The following specification may propose a technical feature for a buffer status report in consideration of a multi-link capable of transferring buffer status information of other links at once through one link. Specifically, the following specification may propose a buffer status report (BSR) operation in consideration of a multi-link that can be used in an environment based on the EHT structure supporting the multi-link.

According to an embodiment, in an AP/non-AP MLD connection structure in which a connection is established through several links, buffer status information of other STAs in the same non-AP MLD may be transmitted together through one link. According to the embodiment, there is an advantage in that data transmission can be performed efficiently. In this case, it may be assumed that each STA in the non-AP MLD has a buffer queue thereof.

Figure 21:
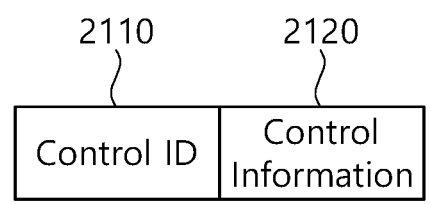
FIG. 21 illustrates an example of a control subfield.

Similarly to the 802.11ax standard, a control subfield of FIG. 21 may be proposed to control and provide the AP with a variety of information of the STA.

FIG. 21 illustrates an example of a control subfield.

Referring to FIG. 21, a control subfield 2100 may include a control ID subfield 2110 and a control information subfield 2120. The control ID subfield 2110 may be called a control ID. The control information subfield 2120 may be called control information.

In the control subfield 2100, the control ID subfield 2110 may include information on an information type included in the control Information subfield 2120. Control information according to the information type may be included in the control Information subfield 2120.

According to an embodiment, an A-control subfield of an HE variant HT control field may be configured based on the control subfield 2100 of FIG. 21. For example, the A-control subfield may include one or more control subfields 2100. The one or more control subfields 2100 may be included in the A-control subfield in the form of a control list subfield. Therefore, a variety of control information may be included in the A-control subfield. An example of the control list subfield may be described with reference to FIG. 22.

Figure 22:
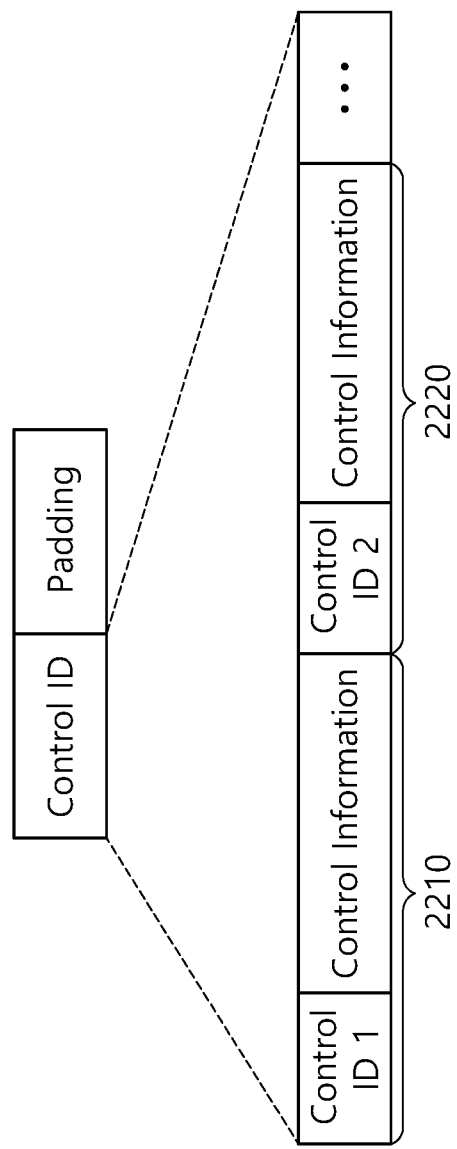
FIG. 22 illustrates an example of a control list subfield.

FIG. 22 illustrates an example of a control list subfield.

Referring to FIG. 22, a control list subfield 2200 may include at least one or more control subfields 2210 and 2220. The control list subfield 2200 may be configured similarly to the HE variant of the 802.11ax standard.

According to an embodiment, the control information which is set/determined based on a value of the control ID subfield 2110 of the control subfield 2100 of FIG. 21 may be configured/set as shown in Table 8.

TABLE 8

| Control ID value | Meaning | Length of the Control Information subfields (bits) | Content of the Control Information subfield |
| --- | --- | --- | --- |
| 0 | Triggered response scheduling (TRS) | 26 | TRS Control |
| 1 | Operating mode (OM) | 12 | OM Control |
| 2 | HE link adaptation (HLA) | 26 | HLA Control |
| 3 | Buffer status report (BSR) | 26 | BSR Control |
| 4 | UL power headroom (UPH) | 8 | UPH Control |
| 5 | Bandwidth query report (BQR) | 10 | BQR Control |
| 6 | Command and status (CAS) | 8 | CAS Control |
| 7-14 | Reserved | | |
| 15 | Ones need expansion surely (ONES) | 26 | HT control field operation |

Referring to Table 8, content of the control information subfield 2120 may be set/determined, based on the value of the control ID subfield 2110 of the control subfield 2100 of FIG. 21. For example, the content of the control information subfield 2120 may be set/determined as information on BSR control, based on that the value of the control ID subfield 2110 is 3.

The value of the control ID subfield 2110 defined as shown in Table 8 and control information on the value may be transmitted by being included in the control information subfield 2120 in the control subfield 2100. Therefore, there is an advantage in that an STA can control/indicate at least one piece of information (or a plurality of pieces of information).

In the following specification, a multi-link control subfield structure may be proposed in consideration of a multi-link in which an STA can request for information on several links (i.e., other STAs) at once.

Figure 23:
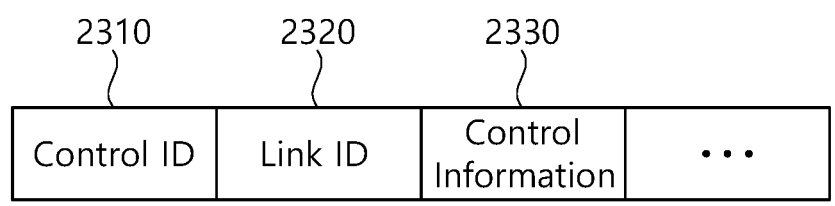
FIG. 23 illustrates another example of a multi-link control subfield.

FIG. 23 illustrates another example of a multi-link control subfield.

Referring to FIG. 23, a multi-link control subfield 2300 may be configured based on a multi-link. In other words, the multi-link control subfield 2300 may be configured in consideration of the multi-link.

Unlike the control subfield 2100 of FIG. 21, the multi-link control subfield 2300 may further include a link ID subfield 2320, in addition to a control ID subfield 2310 and a control information subfield 2330. The link ID subfield 2320 may be called a link ID.

For example, the control ID subfield 2310 may be first transmitted in the multi-link control subfield 2300. The link ID subfield 2320 may be transmitted after the control ID subfield 2310 is transmitted. The control information subfield 2330 may be transmitted after the link ID subfield 2320 is transmitted.

The control information subfield 2330 may include control information corresponding to a link indicated through the link ID subfield 2320.

According to an embodiment, information on one or more links may be indicated for one control ID. The multi-link control subfield 2300 may include control information for each link. Therefore, a non-AP MLD may indicate/transmit control information on other STAs in the non-AP MLD through one frame including the multi-link control subfield 2300.

According to an embodiment, a control information per link subfield, which includes a link ID subfield and a control information subfield, may be defined. A multi-link control subfield including the control information per link subfield may be described with reference to FIG. 24.

Figure 24:
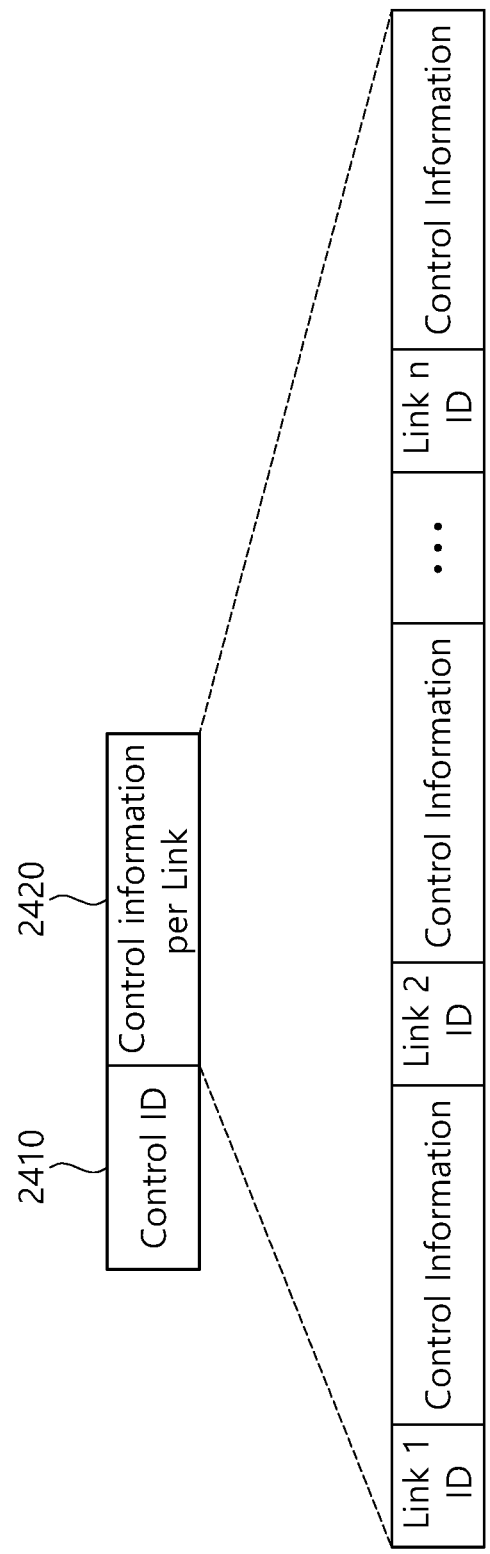
FIG. 24 illustrates an example of a multi-link control subfield.

FIG. 24 illustrates an example of a multi-link control subfield.

Referring to FIG. 24, a multi-link control subfield 2400 may include a control ID subfield 2410 and a control information per link subfield 2420 including control information for each link. The control information per link subfield 2420 may be configured in a structure in which link ID information (e.g., link 1 ID and link 2 ID) for indicating each link and control information indicating information corresponding to each link are transmitted sequentially.

For example, a value of the control ID subfield 2410 may be set to 3 to indicate/transmit BSR information of an STA. In this case, the control information per link subfield 2420 may include buffer status information for each link (i.e., STA).

As described above, information on each STA is indicated by using a link ID subfield to transfer information on other STAs through one link. This is because the link ID subfield is used when a non-AP MLD and an AP MLD determine with a specific AP with which each STA will set up a link in a multi-link setup process.

In other words, since the non-AP MLD and the AP MLD exchange link ID information (i.e., link ID subfield) for each link in the multi-link setup (i.e., association) process, the non-AP MLD may store/obtain an identifier (ID) of each link. Therefore, the non-AP MLD may be aware of the ID of each link.

Therefore, when information on other STAs is transferred in one frame, if the information on other STAs is transferred distinctively using the link ID subfield, the AP MLD which has received this can distinctively receive link ID information and control information corresponding thereto irrespective of a link for reception.

Hereinafter, an example of the aforementioned element for obtaining a link ID may be described. The basic variant multi-link element may be used as the element for obtaining the link ID. For example, a link info field of the basic variant multi-link element may include an optional subelements field. The optional subelements field may include zero or more subelements. The subelements may include at least one of a subelement ID, a length, and data.

When the subelement ID of the subelements is set to 0, it may be called a per-STA profile subelement. The per-STA profile subelement may include a per-STA control field. The per-STA control field may include at least one of a link ID subfield and a complete profile subfield. The link ID subfield may designate a value (or link ID) which uniquely identifies a link in which the STA is operating. Therefore, an AP MLD and a non-AP MLD may identify a link ID for an operating link, based on the link ID subfield. The element (or field) may be included in a multi-link setup and association frame format. The multi-link setup and association frame format may relate to usage and rules of basic variant multi-link element in the context of multi-link setup(35.3.5.4) and basic variant multi-link element(9.4.2.247b.2) of the 802.11be standard.

According to an embodiment, the STA may indicate/transmit a variety of control information for several links to an AP at once, by including several control IDs and control information per link corresponding thereto in the control list subfield. In other words, the STA may indicate/transmit to the AP the multiple control information for the multiple links through one frame. The control link subfield in the A-control field for the aforementioned embodiment may be described with reference to FIG. 25.

Figure 25:
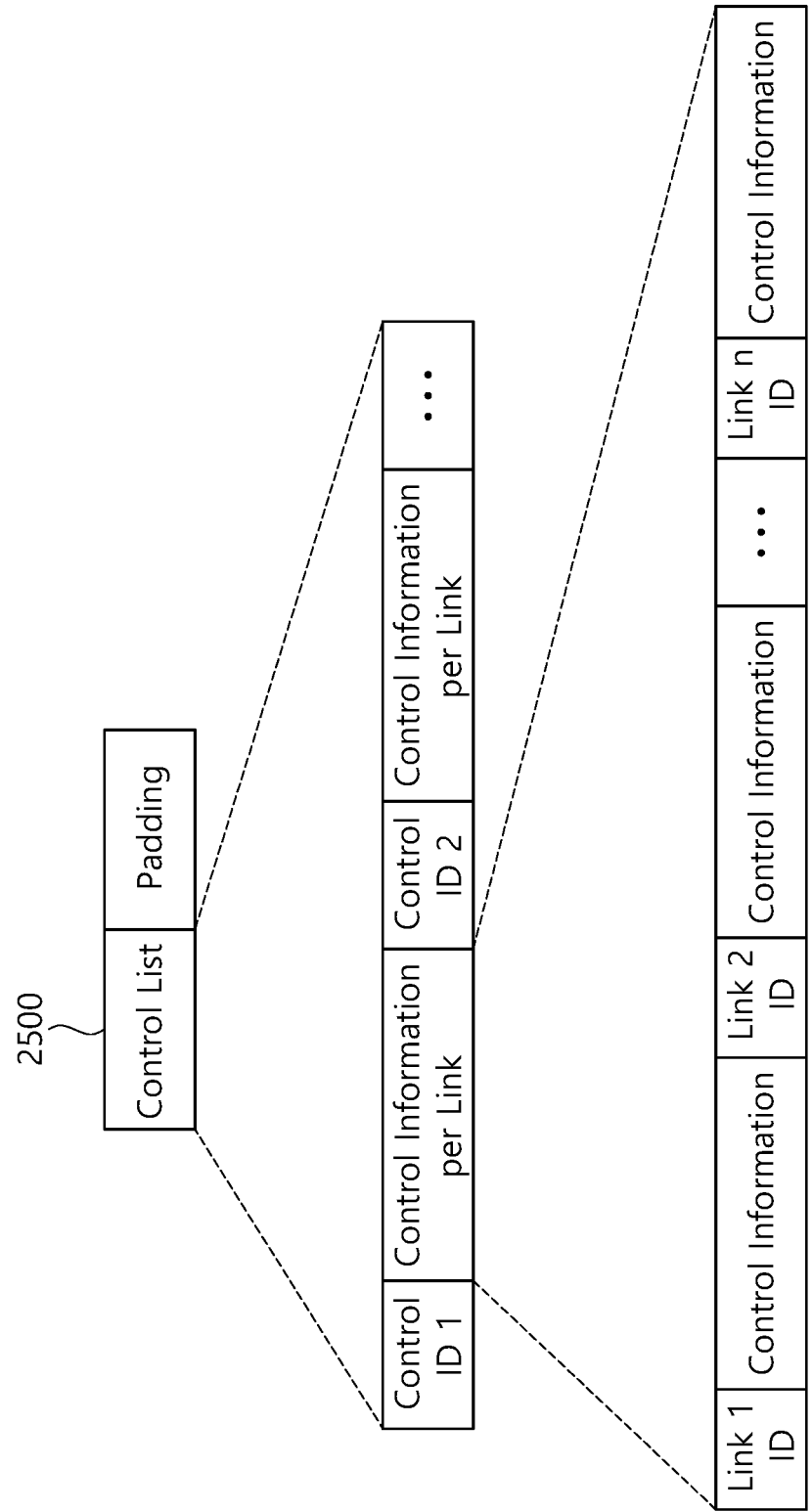
FIG. 25 illustrates an example of a control list subfield.

FIG. 25 illustrates an example of a control list subfield.

Referring to FIG. 25, a control list subfield 2500 may include an A-control field. The control list subfield 2500 may include at least one multi-link control subfield (e.g., the multi-link control subfield 2400 of FIG. 24).

A field structure in which an STA is capable of transferring a variety of control information at once for several links is proposed with reference to FIG. 21 to FIG. 25. Based on the proposed field structure, the STA may perform transmission by including control information subfield information for each link in the control information per link subfield. Therefore, there is an advantage in that the STA is capable of transferring control information content for other STAs at once.

According to an embodiment, the field structure considering the multi-link may be particularly useful for a non-AP MLD operating in a power save mode. Regarding an MLD supporting the multi-link, it is defined in the EHT standard that beacon reception is not required for all links. This may imply that some links (e.g., anchor links) periodically awake to receive a beacon, whereas some other links (e.g., non-anchor links) may maintain a doze state irrespectively of beacon reception to reduce power. As such, in case of the non-AP MLD operating in the power save mode, it may be ineffective in terms of power consumption that all corresponding links awake to transmit control information of the STA through the A-control field.

Therefore, according to the embodiment proposed in the present specification, it is not necessary for all links to awake for information transmission. By using a link of an STA which is currently in an awake state or which is currently waiting for UL traffic transmission, one frame including not only information on the currently waiting STA but also information of other STAs may be transmitted. According to the aforementioned embodiment, there is an advantage in that an operation can be performed very efficiently not only in terms of a frame overhead but also in terms of power saving.

In the following specification, a technical feature for a buffer status report (BSR) operation of a non-AP MLD may be proposed. A BSR control information subfield structure for a BSR operation considering a multi-link may be proposed below. There is an advantage in that efficiency of information transmission between links can be increased through the BSR control information subfield structure for the BSR operation considering the multi-link, proposed below.

Figure 26:
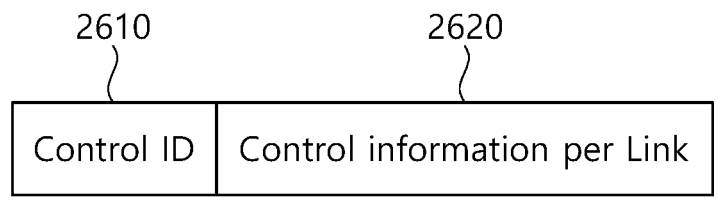
FIG. 26 illustrates an example of a BSR control subfield considering a multi-link.

FIG. 26 illustrates an example of a BSR control subfield considering a multi-link.

Referring to FIG. 26, a BSR control subfield 2600 may include a control ID subfield 2610 and a control information per link subfield 2620. The BSR control subfield 2600 may indicate/include control information for each link. Therefore, a non-AP MLD may indicate/transmit BSR information for all STAs in the non-AP MLD through one frame.

The control information per link 2620 may include at least one BSR control information subfield for each link. For example, the control information per link subfield 2620 in the BSR control subfield 2600 may include BSR control information subfield as many as the number of links in the non-AP MLD. The BSR control information subfield may be described with reference to FIG. 27.

FIG. 27 illustrates an example of a BSR control information subfield.

Referring to FIG. 27, a BSR control information subfield 2700 may include a link ID subfield 2710, an access category indicator (ACI) bitmap subfield 2720, a delta TID subfield 2730, an ACI high subfield 2740, a scaling factor subfield 2750, a queue size high subfield 2760, and/or a queue size all subfield 2770.

The link ID subfield 2710 may include information on a link identifier (ID) for identifying a link. The ACI bitmap subfield 2720 may include information on an access category in which a buffer status is reported. The delta TID subfield 2730 may include information on the number of traffic identifiers (TIDs) for reporting the buffer status. The ACI high subfield 2740 may include information on an ACI of an access category in which a BSR is indicated in the queue size high subfield 2760. The scaling factor subfield 2750 may indicate a scaling factor (SF) of the queue size high subfield 2760 and queue size all subfield 2770, and the SF may be configured in unit of octets. The queue size high subfield 2760 may include information on an amount of traffic (or data) buffered for an access category (AC) identified through the ACI high subfield 2740. The queue size all subfield 2770 may include information on an amount of traffic buffered to all ACs identified by the ACI bitmap subfield 2720.

A specific example of the BSR control subfield may be described with reference to FIG. 28, in consideration of the aforementioned BSR control information subfield.

Figure 28:
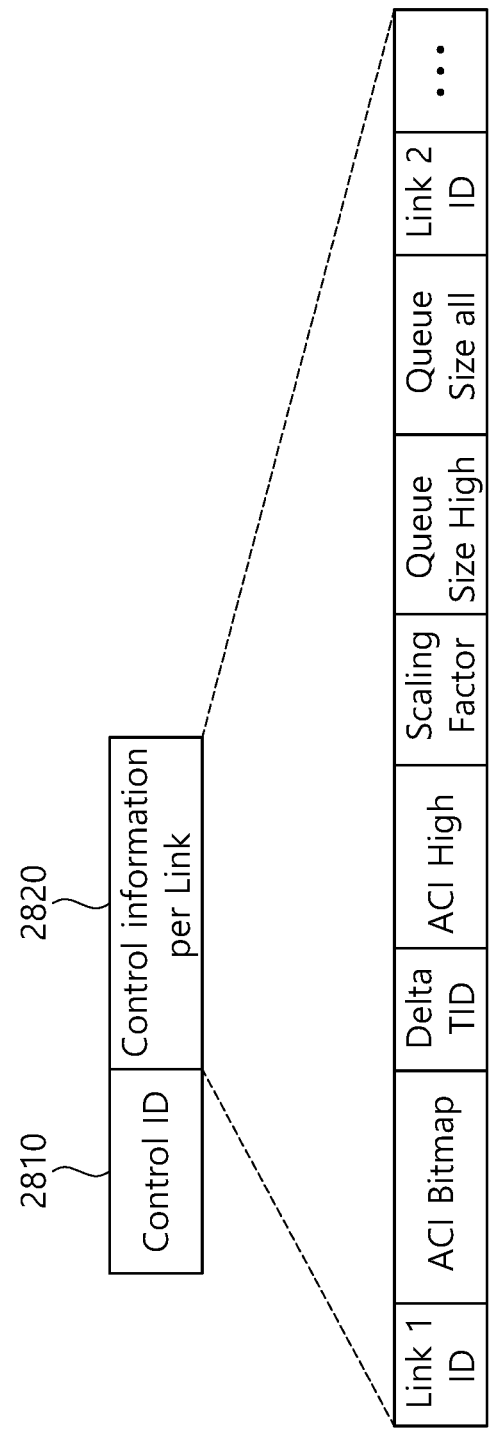
FIG. 28 illustrates a specific example of a BSR control subfield.

FIG. 28 illustrates a specific example of a BSR control subfield.

Referring to FIG. 28, a BSR control subfield 2800 may include a control ID subfield 2810 and a control information per link subfield 2820. The control information per link subfield 2820 may include at least one BSR control information subfield. The at least one BSR control information subfield may be configured contiguously in the control information per link subfield 2820.

Conventionally, buffer status information for one STA indicated in one RA can be indicated. However, according to an embodiment of the present specification, there is an advantage in that buffer status information for all STAs in a non-AP MLD can be indicated through one frame. In addition, an AP MLD which has received this may allocate a resource for a UL-MU operation by considering a buffer status of all STAs in the non-AP MLD.

According to an embodiment, an example of a field format of the aforementioned embodiment (e.g., the embodiment of FIG. 27 or FIG. 28) may be applied to a BSR control frame based on a solicited BSR method and an unsolicited BSR method.

According to the aforementioned embodiment, when buffer status information of all links is transmitted to an AP by being included in one frame, the AP MLD may obtain buffer status information of all links (i.e., STAs) in the non-AP MLD through frame exchange performed one time. Therefore, there is an advantage in that the AP MLD can provide a resource for a proper UL-MU operation for each link (i.e., STA), based on the frame exchange.

The field structure considering the multi-link may be particularly useful for a non-AP MLD operating in a power save mode. For example, in an EHT standard, the non-AP MLD operating in the power save mode does not have to perform beacon reception for all links. Therefore, some links (e.g., anchor links) may periodically awake to receive a beacon. In addition, some other links (e.g., non-anchor links) may maintain a doze state irrespectively of beacon reception to reduce power.

As described above, in case of the non-AP MLD operating in the power save mode, it may be ineffective in terms of power consumption that all corresponding links awake to transmit control information of the STA through the A-control field. Therefore, according to the embodiment proposed in the present specification, it is not necessary for all links to awake for information transmission. Instead, by using a link of an STA which is currently in an awake state or which is currently waiting for UL traffic transmission, one frame including information of other STAs together may be transmitted. Therefore, according to the aforementioned embodiment, there is an advantage in that an operation can be performed very efficiently not only in terms of a frame overhead but also in terms of power saving.

An embodiment for an information transmission process through the aforementioned BSR control subfield may be described in detail with reference to FIG. 29.

Figure 29:
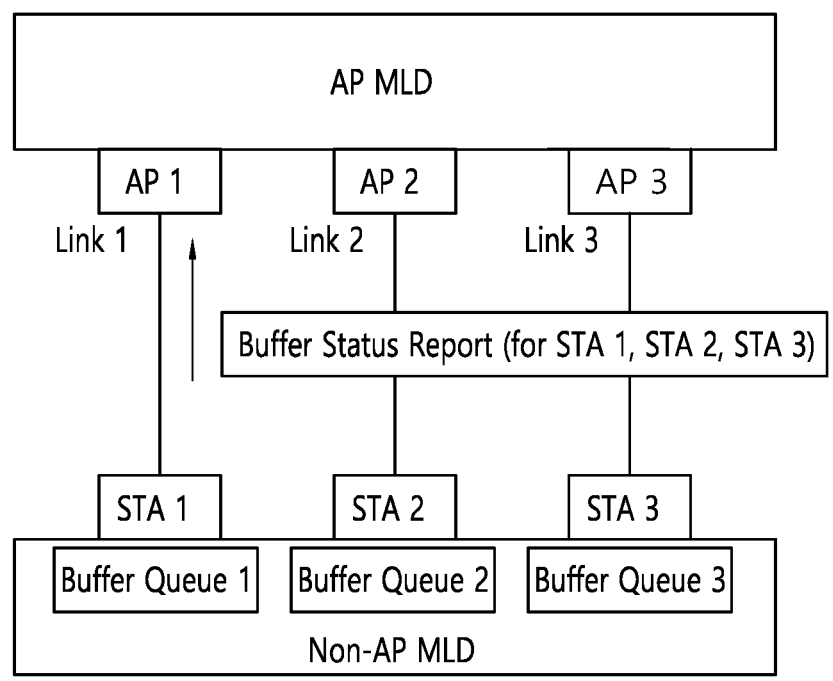
FIG. 29 illustrates an example of a BSR operation considering a multi-link.

FIG. 29 illustrates an example of a BSR operation considering a multi-link.

Referring to FIG. 29, an AP MLD may include an AP 1, an AP 2, and an AP 3. A non-AP MLD may include an STA 1, an STA 2, and an STA 3. The AP 1 and the STA 1 may be connected through a link 1. The AP 2 and the STA 2 may be connected through a link 2. The AP 3 and the STA 3 may be connected through a link 3.

For example, the non-AP MLD may perform an unsolicited BSR operation. In this case, the STA 1 of the non-AP MLD may transmit buffer status information of all STAs (e.g., the STA 1, the STA 2, and the STA 3) by using one frame (i.e., BSR frame) to an AP MLD through the link 1.

According to an embodiment, the STA which transmits the BSR frame may not be designated. When one link of the multi-link is in an enable state or an awake state in a power save mode, the BSR may be transmitted through an STA operating in the link. For example, in FIG. 29, since the link 1 operates in the awake state, the non-AP MLD may perform an unsolicited BSR operation through the STA 1.

A BSR frame transmitted through the unsolicited BSR operation may include the control information per link subfield of the aforementioned embodiment. In other words, the buffer status report frame may include buffer status information for all links in the non-AP MLD.

For example, the non-AP MLD may perform a solicited BSR operation. The non-AP MLD may receive a frame (e.g., a buffer status report poll (BSRP) frame) for requesting for the BSR. The non-AP MLD may transmit the BSR to the AP MLD, in response to the frame. Similarly to the unsolicited BSR operation, the non-AP MLD may transmit the BSR for all STAs in the non-AP MLD through one link.

Figure 30:
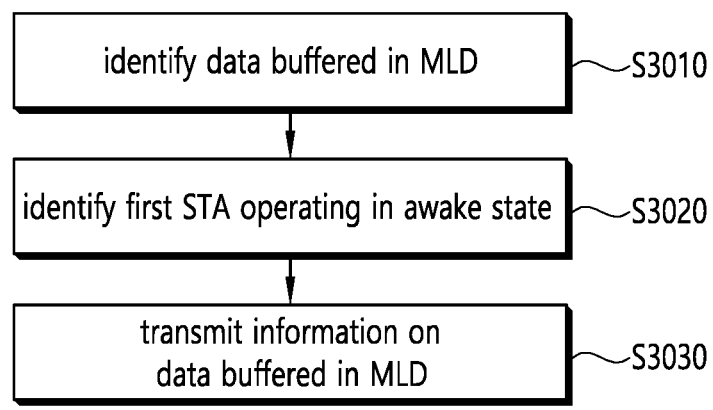
FIG. 30 is a flowchart illustrating an operation of a multi-link device.

FIG. 30 is a flowchart illustrating an operation of a multi-link device (MLD).

Referring to FIG. 30, in step S3010, the MLD may identify data buffered in the MLD.

According to an embodiment, the MLD may include a first STA and a second STA. For example, the first STA may relate to a first link. For example, the first STA may operate in the first link. In other words, the first STA may be connected to the first link. For example, the second STA may relate to a second link. For example, the second STA may operate in the second link. In other words, the second STA may be connected to the second link.

According to an embodiment, the first link may be included in one of 2.4 GHz, 5 GHz, and 6 GHz bands. In addition, the second link may also be included in one of the 2.4 GHz, 5 GHz, and 6 GHz bands.

According to an embodiment, the first link may be configured in combination of at least one channel included in the 2.4 GHz, 5 GHz, and 6 GHz bands. The second link may also be configured in combination of at least one channel included in the 2.4 GHz, 5 GHz, and 6 GHz bands.

According to an embodiment, the first STA may include a first processor and/or a first transceiver. In addition, the second STA may include a second processor and/or a second transceiver.

For example, the first STA and the second STA may be controlled by a processor of the MLD, and may operate by the processor of the MLD. For example, the processor of the MLD may request a processor of the first STA to transmit/receive a signal through the first link. The processor of the first STA may transmit/receive a signal through the first link in response to the request.

As another example, the first STA and the second STA may operate independently. For example, the first STA may perform communication through the first link, based on the first processor and the first transceiver. In addition, the second STA may perform communication through the second link, based on the second processor and the second transceiver. The processor of the MLD may transmit information required for a multi-link operation to the first STA or the second STA. The first STA or the second STA may perform the multi-link operation, based on the information required for the multi-link operation.

According to an embodiment, the MLD may be in a state of being connected with an AP MLD. For example, the AP MLD may include a first AP and a second AP. The first STA may be connected with the first AP through the first link. The second STA may be connected with the second AP through the second link. For example, the MLD may perform an association process with respect to the AP MLD. The MLD may establish a connection with the AP MLD, based on the association process, and may obtain an ID for the first link and an ID for the second link.

According to an embodiment, the MLD may identify data buffered therein. For example, the MLD may identifier data buffered in at least one of the first STA and the second STA.

According to an embodiment, the MLD may receive a frame which requests for information on data buffered in the MLD. In response to the frame which requests for the information on data buffered in the MLD, the MLD may identify data buffered therein. For example, the MLD may receive a buffer status report poll (BSRP) frame. In response to the BSRP frame, the MLD may identify the data buffered therein.

In step S3020, the MLD may identify the first STA operating in an awake state out of the first STA and the second STA.

According to an embodiment, the MLD may operate in a power save (PS) mode. For example, the first STA may operate in the awake state, and the second STA may operate in the doze state. Therefore, the MLD may identify the first STA operating in the awake state out of the first STA and the second STA.

For example, the first link may operate as an anchor link. The second link may operate as a non-anchor link. Therefore, the first STA (or first link) may operate periodically in the awake state to receive a beacon. The second STA (or second link) may operate in the doze state irrespective of beacon reception. For example, the MLD may wait until a timing at which the first STA awakes. Thereafter, the MLD may identify the first STA operating in the awake state.

In step S3030, the MLD may transmit information on the data buffered in the MLD. According to an embodiment, the MLD may transmit the information on data buffered in the MLD, through the first STA. For example, the information on data buffered in the MLD may be transmitted through a buffer status report (BSR) frame. For example, the BSR frame may include a control ID subfield and a control information per link subfield. The control information per link subfield may include the information on data buffered in the MLD.

According to an embodiment, the information on data buffered in the MLD may include a first information field related to the first STA and a second information field related to the second STA.

For example, the first information field may include the ID for the first link and information on a queue buffered in the first STA. The second information field may include the ID for the second link and information on a queue buffered in the second STA.

For example, the ID for the first link and the ID for the second link may be obtained in an association process with respect to the AP MLD. Each of the ID for the first link and the ID for the second link may be set to 4 bits.

For example, information on a queue buffered in the first STA may include information on an access category indicator (ACI), information on a data traffic identifier (TID), information on a scaling factor, and information on a queue size. Information on a queue buffered in the second STA may also include information on an ACI, information on a data TID, information on a scaling factor, and information on a queue size. The information on the queue buffered in the first STA and the information on the queue buffered in the second STA may be configured to be different from each other, and may be set to a different value depending on data buffered in each STA (e.g., the first STA and the second STA).

Accordingly, the MLD may transmit information on data buffered in all links (e.g., the first link and the second link) connected to the MLD, based on the aforementioned process.

Figure 31:
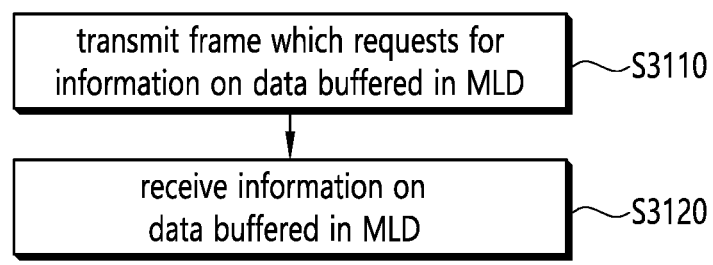
FIG. 31 is a flowchart illustrating an operation of an AP multi-link device.

FIG. 31 is a flowchart illustrating an operation of an AP MLD.

Referring to FIG. 31, in operation S3110, the AP MLD may transmit a frame which requests for information on data buffered in an MLD According to an embodiment, the AP MLD may include a first AP and a second AP. For example, the first AP may relate to a first link. For example, the first AP may operate in the first link. In other words, the first AP may be connected to the first link. For example, the second AP may relate to a second link. For example, the second AP may operate in the second link. In other words, the second AP may be connected to the second link.

According to an embodiment, the first link may be included in one of 2.4 GHz, 5 GHz, and 6 GHz bands. In addition, the second link may also be included in one of the 2.4 GHz, 5 GHz, and 6 GHz bands.

According to an embodiment, the first link may be configured in combination of at least one channel included in the 2.4 GHz, 5 GHz, and 6 GHz bands. The second link may also be configured in combination of at least one channel included in the 2.4 GHz, 5 GHz, and 6 GHz bands.

According to an embodiment, the first AP may include a first processor and/or a first transceiver. In addition, the second AP may include a second processor and/or a second transceiver.

For example, the first AP and the second AP may be controlled by a processor of the AP MLD, and may operate by the processor of the AP MLD. For example, the processor of the AP MLD may request a processor of the first AP to transmit/receive a signal through the first link. The processor of the first AP may transmit/receive a signal through the first link in response to the request.

As another example, the first AP and the second AP may operate independently. For example, the first AP may perform communication through the first link, based on the first processor and the first transceiver. In addition, the second AP may perform communication through the second link, based on the second processor and the second transceiver. The processor of the AP MLD may transmit information required for a multi-link operation to the first AP or the second AP. The first AP or the second AP may perform the multi-link operation, based on the information required for the multi-link operation.

According to an embodiment, the AP MLD may be in a state of being connected with the MLD. For example, the MLD may include a first STA and a second STA. The first AP may be connected with the first STA through the first link. The second AP may be connected with the second STA through the second link. For example, the AP MLD may perform an association process with respect to the MLD. The AP MLD may establish a connection with the MLD, based on the association process, and may obtain/configure/transmit an ID for the first link and an ID for the second link. Each of the ID for the first link and the ID for the second link may be set to 4 bits.

According to an embodiment, the AP MLD may transmit a frame which requests for information on data buffered in the MLD. For example, the AP MLD may transmit a buffer status report poll (BSRP) frame.

In step S3120, the AP MLD may receive information on the data buffered in the MLD.

According to an embodiment, the AP MLD may receive the information on data buffered in the MLD, through the first AP. For example, the information on data buffered in the MLD may be received through a buffer status report (BSR) frame. For example, the BSR frame may include a control ID subfield and a control information per link subfield. The control information per link subfield may include the information on data buffered in the MLD.

According to an embodiment, the information on data buffered in the MLD may include a first information field related to the first STA and a second information field related to the second STA.

For example, the first information field may include the ID for the first link and information on a queue buffered in the first STA. The second information field may include the ID for the second link and information on a queue buffered in the second STA.

For example, information on a queue buffered in the first STA may include information on an access category indicator (ACI), information on a data traffic identifier (TID), information on a scaling factor, and information on a queue size. Information on a queue buffered in the second STA may include information on an ACI, information on a data TID, information on a scaling factor, and information on a queue size. The information on the queue buffered in the first STA and the information on the queue buffered in the second STA may be configured differently, and may be set to different values depending on data buffered in each STA (e.g., the first STA and the second STA).

Therefore, the AP MLD may receive information on data buffered in all links (e.g., the first link and the second link) connected to the MLD, based on the aforementioned process.

The aforementioned technical feature of the present specification may be applied to various apparatuses and methods. For example, the aforementioned technical feature of the present specification may be performed/supported through the device of FIG. 1 and/or FIG. 19. For example, the aforementioned technical feature of the present specification may be applied only to part of FIG. 1 and/or FIG. 19. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 19. For example, the apparatus of the present specification may include a processor and a memory coupled to the processor. The processor may be configured to: identify data buffered in a multi-link device (MLD); identify a first station (STA) operating in an awake state out of the first STA for the first link and a second STA for the second link, which are included in the MLD; and transmit information on the data buffered in the MLD through the first STA. The information on the data buffered in the MLD may include a first information field for the first STA and a second information field for the second STA. The first information field may include an identifier (ID) for the first link and information on a queue buffered in the first STA. The second information field may include an ID for the second link and information on a queue buffered in the second STA.

The technical feature of the present specification may be implemented based on a computer readable medium (CRM). For example, the CRM proposed in the present specification may be encoded with at least one computer program including instructions. The instruction, when executed by the at least one processor, may cause the at least one processor to perform operations including: identifying data buffered in an MLD; identifying a first STA operating in an awake state out of the first STA for the first link and a second STA for the second link, which are included in the MLD; and transmitting information on the data buffered in the MLD through the first STA. The information on the data buffered in the MLD may include a first information field for the first STA and a second information field for the second STA. The first information field may include an ID for the first link and information on a queue buffered in the first STA. The second information field may include an ID for the second link and information on a queue buffered in the second STA. The instruction stored in the CRM of the present specification may be executed by at least one processor. The at least one processor related to the CRM of the present specification may be the processors 111 and 121 or processing chips 114 and 124 of FIG. 1 or the processor 610 of FIG. 19. Meanwhile, the CRM of the present specification may be the memories 112 and 122 of FIG. 1 or the memory 620 of FIG. 19 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according to uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method performed in a multi-link device (MLD) operating in a first link and second link of a wireless local area network (WLAN) system, the method comprising:
   performing an association process;
   obtaining a first identifier (ID) for the first link and a second ID for the second link, based on the association process,
   wherein the first ID for the first link has a length of 4 bits, and the second ID for the second link has a length of 4 bits;
   identifying data buffered in the MLD;
   identifying a first station (STA) operating in an awake state out of the first STA related to the first link and a second STA related to the second link, which are included in the MLD; and
   transmitting information on the data buffered in the MLD through the first STA,
   wherein the information on the data buffered in the MLD includes a first information field related to the first STA and a second information field related to the second STA,
   wherein the first information field includes the first ID for the first link and information on a queue buffered in the first STA, and
   wherein the second information field includes the second ID for the second link and information on a queue buffered in the second STA.

2. The method of claim 1, further comprising receiving a frame which requests for the information on the data buffered in the MLD.

3. The method of claim 1, wherein the MLD operates in a power save (PS) mode.

4. The method of claim 3, wherein the second STA operates in a doze state.

5. The method of claim 1, wherein the information on the data buffered in the MLD is transmitted through a buffer status report (BSR) frame.

6. The method of claim 5, wherein the information on the queue buffered in the first STA includes information on an access category indicator (ACI), information on a data traffic identifier (TID), information on a scaling factor, and information on a queue size.

7. The method of claim 1,
   wherein the first link operates as an anchor link, and
   wherein the second link operates as a non-anchor link.

8. The method of claim 1,
   wherein the first link is included in one of 2.4 GHz, 5 GHz, and 6 GHz bands, and wherein the second link is included in one of the 2.4 GHz, 5 GHz, and 6 GHz bands.

9. A method performed in an access point (AP) multi-link device (MLD) operating in a first link and second link of a wireless local area network (WLAN) system, the method comprising:
   performing an association process;
   transmitting a first identifier (ID) for the first link and a second ID for the second link, based on the association process,
   wherein the first ID for the first link has a length of 4 bits, and the second ID for the second link has a length of 4 bits;
   transmitting a frame which requests for information on data buffered in the MLD; and
   receiving the information on the data buffered in the MLD through a first AP related to the first link,
   wherein the information on the data buffered in the MLD includes a first information field related to a first STA included in the MLD and a second information field related to a second STA included in the MLD,
   wherein the first information field includes the first ID for the first link and information on a queue buffered in the first STA, and
   wherein the second information field includes the second ID for the second link and information on a queue buffered in the second STA.

10. A multi-link device (MLD) operating in a first link and second link of a wireless local area network (WLAN) system, the MLD comprising:
    a first station (STA) related to the first link;
    a second STA related to the second link; and
    a processor coupled to the first STA and second STA, wherein the processor is configured to:
    perform an association process;
    obtain a first identifier (ID) for the first link and a second ID for the second link, based on the association process,
    wherein the first ID for the first link has a length of 4 bits, and the second ID for the second link has a length of 4 bits;
    identify data buffered in the MLD;
    identify the first STA operating in an awake state out of the first STA and second STA included in the MLD; and
    transmit information on the data buffered in the MLD through the first STA,
    wherein the information on the data buffered in the MLD includes a first information field related to the first STA and a second information field related to the second STA, wherein the first information field includes the first ID for the first link and information on a queue buffered in the first STA, and wherein the second information field includes the second ID for the second link and information on a queue buffered in the second STA.

11. The MLD of claim 10, wherein the processor is further configured to receive a frame which requests for the information on the data buffered in the MLD.

12. The MLD of claim 10, wherein the information on the data buffered in the MLD is transmitted through a buffer status report (BSR) frame.

13. The MLD of claim 12, wherein the information on the queue buffered in the first STA includes information on an access category indicator (ACI), information on a data traffic identifier (TID), information on a scaling factor, and information on a queue size.

14. The MLD of claim 10,
wherein the first link operates as an anchor link, and
wherein the second link operates as a non-anchor link.

15. An access point (AP) multi-link device (MLD) operating in a first link and second link of a wireless local area network (WLAN) system, the AP MLD comprising:
a first AP related to the first link;
a second AP related to the second link; and
a processor coupled to the first AP and second AP, wherein the processor is configured to:
perform an association process;
transmit a first identifier (ID) for the first link and a second ID for the second link, based on the association process,
wherein the first ID for the first link has a length of 4 bits, and the second ID for the second link has a length of 4 bits;
transmit a frame which requests for information on data buffered in the MLD; and
receive the information on the data buffered in the MLD through a first AP related to the first link,
wherein the information on the data buffered in the MLD includes a first information field related to a first STA included in the MLD and a second information field related to a second STA included in the MLD, wherein the first information field includes the first ID for the first link and information on a queue buffered in the first STA, and wherein the second information field includes the second ID for the second link and information on a queue buffered in the second STA.

16. An apparatus used in a wireless local area network (WLAN) system, the apparatus comprising:
a processor; and
a memory coupled to the processor,
wherein the processor is configured to:
perform an association process;
obtain a first identifier (ID) for the first link and a second ID for the second link, based on the association process,
wherein the first ID for the first link has a length of 4 bits, and the second ID for the second link has a length of 4 bits;
identify data buffered in a multi-link device (MLD);
identify a first station (STA) operating in an awake state out of the first STA related to the first link and a second STA related to the second link, which are included in the MLD; and
transmit information on the data buffered in the MLD through the first STA,
wherein the information on the data buffered in the MLD includes a first information field related to the first STA and a second information field related to the second STA,
wherein the first information field includes the first ID for the first link and information on a queue buffered in the first STA, and
wherein the second information field includes the second ID for the second link and information on a queue buffered in the second STA.

* * * * *